US012786003B2

(12) United States Patent
Shen

(10) Patent No.: US 12,786,003 B2
(45) Date of Patent: Nov. 3, 2026

(54) INTEGRATED CIRCUIT AND COMMUNICATION METHOD FOR THE SAME, ELECTRONIC DEVICE, AND STORAGE MEDIUM

(71) Applicant: XG TECH PTE. LTD., Singapore (SG)

(72) Inventor: Xinwei Shen, Singapore (SG)

(73) Assignee: XG TECH PTE. LTD., Singapore (SG)

( * ) Notice: Subject to any disclaimer, the term of this patent is extended or adjusted under 35 U.S.C. 154(b) by 0 days.

(21) Appl. No.: 18/963,617

(22) Filed: Nov. 28, 2024

(65) Prior Publication Data

US 2025/0097068 A1 Mar. 20, 2025

(30) Foreign Application Priority Data

May 31, 2024 (CN) ......................... 202410702680.5
Sep. 11, 2024 (CN) ......................... 202411275751.4

(51) Int. Cl.
*H04L 12/40* (2006.01)

(52) U.S. Cl.
CPC .................. *H04L 12/40006* (2013.01); *H04L 12/40104* (2013.01); *H04L 2012/40273* (2013.01)

(58) Field of Classification Search
CPC ......... H04L 12/40006; H04L 12/40104; H04L 2012/40273
See application file for complete search history.

(56) References Cited

U.S. PATENT DOCUMENTS 6,973,593 B1 * 12/2005 Zani ...................... G06F 11/263 714/30
10,824,765 B2 * 11/2020 Thompson ............ G06F 21/604
(Continued)

FOREIGN PATENT DOCUMENTS

JP 2012213036 A 11/2012
JP 2021096729 A 6/2021
(Continued)

OTHER PUBLICATIONS

Extended European Search Report from corresponding European Patent Application No. 24216070.3, mailed on May 21, 2025.

First Japanese office action from corresponding Japanese patent application No. 2024-207665, mailed on Nov. 4, 2025 and its English translation.

(Continued)

*Primary Examiner* — Henry Tsai
*Assistant Examiner* — Christopher A Daley
(74) *Attorney, Agent, or Firm* — K&L Gates LLP

(57) ABSTRACT

Disclosed are an integrated circuit and a communication method for the integrated circuit, an electronic device, and a storage medium, which relate to the field of technologies of an integrated circuit. The integrated circuit includes a first functional module, a second functional module, an interconnection module, and a first isolation module. The first functional module is communicatively connected to the second functional module through the interconnection module. The first isolation module is disposed on a communication link between the first functional module and the interconnection module. The second functional module is configured to transmit a first message to the first functional module. The first isolation module is configured to control transmission of the first message based on a correspondence between the first message and a first preset protocol. In the solution provided in the present disclosure, the first isolation module may control the transmission of the first message.

20 Claims, 8 Drawing Sheets

(56) References Cited

U.S. PATENT DOCUMENTS

| | | | | |
|---|---|---|---|---|
| 11,775,463 | B2 | 10/2023 | Lee et al. | |
| 11,876,879 | B2 * | 1/2024 | Mardmoeller | H04L 12/66 |
| 12,235,950 | B2 | 2/2025 | Dastidar et al. | |
| 2012/0250866 | A1 | 10/2012 | Matsuo | |
| 2019/0281052 | A1 * | 9/2019 | Lekkas | H04L 9/14 |
| 2019/0379682 | A1 | 12/2019 | Overby et al. | |
| 2021/0092097 | A1 * | 3/2021 | Law | H04L 63/0227 |
| 2022/0038304 | A1 * | 2/2022 | Tindell | H04L 63/1466 |
| 2022/0159018 | A1 * | 5/2022 | Kim | H04L 63/0236 |
| 2023/0290189 | A1 | 9/2023 | Chen et al. | |

FOREIGN PATENT DOCUMENTS

| | | | |
|---|---|---|---|
| KR | 1020220125897 | A | 9/2022 |
| WO | 2023140921 | A1 | 7/2023 |

OTHER PUBLICATIONS

First Korean Office Action from the corresponding Korean patent application No. 10-2024-0181925, mailed on Jul. 3, 2026 and its English translation.

Second Japanese office action from corresponding Japanese patent application No. 2024-207665, mailed on May 12, 2026 and its English translation.

* cited by examiner

INTEGRATED CIRCUIT AND COMMUNICATION METHOD FOR THE SAME, ELECTRONIC DEVICE, AND STORAGE MEDIUM

CROSS-REFERENCE TO RELATED APPLICATIONS

The present application claims priority to Chinese Patent Application No. 202410702680.5 filed on May 31, 2024, and Chinese Patent Application No. 202411275751.4 filed on Sep. 11, 2024, which are incorporated herein by reference in its entirety.

TECHNICAL FIELD

The present disclosure relates to the field of technologies of an integrated circuit, and in particular, to an integrated circuit and a communication method for the integrated circuit, an electronic device, and a storage medium.

BACKGROUND

With continual progress and development, intelligent vehicles typically integrate a series of operating systems with rich service functions, such as intelligent driving systems, intelligent cockpit systems, in-vehicle infotainment systems, and safety island systems.

At present, a plurality of operating systems may run in one integrated circuit. For example, the integrated circuit may include a plurality of integrated sub-circuits, and each integrated sub-circuit may serve as a functional module. In this way, the integrated circuit may include a plurality of functional modules, and each of the functional modules may run one operating system separately.

During simultaneous running of the plurality of operating systems, data interactions may occur among different functional modules of the integrated circuit. When abnormal data is transmitted from one functional module to another functional module, the functional module receiving the abnormal data may enter a stuck state due to an inability to process the abnormal data, which may reduce operation reliability of the integrated circuit.

SUMMARY OF THE INVENTION

Embodiments of the present disclosure provide an integrated circuit, an integrated circuit system, and a communication method, which can improve operation reliability of the integrated circuit.

According to a first aspect of the present disclosure, an integrated circuit is provided, including: a first processor, a second processor, a bus, and a first isolation circuit, wherein the first processor is communicatively connected to the second processor through the bus, and the first isolation circuit is disposed on a communication link between the first processor and the bus; the second processor is configured to transmit a first message to the first processor; and the first isolation circuit is configured to control transmission of the first message based on a correspondence between the first message and a first preset protocol.

For example, the second processor is configured to transmit a first message to the first processor. The first isolation circuit is configured to control transmission of the first message based on a correspondence between the first message and a first preset protocol. The controlling transmission of the first message may be controlling whether the first message continues to be transmitted, controlling a transmission time of the first message, controlling a transmission carrier of the first message, or the like.

In the integrated circuit provided in the present disclosure, in a case that the second processor transmits a first message to the first processor, the first isolation circuit may control transmission of the first message based on a correspondence between a first preset protocol and the first message. In this way, the first processor is prevented from receiving a first message not in correspondence to the first preset protocol and thus is not stuck, thereby improving reliability of the integrated circuit.

According to a second aspect of the present disclosure, a communication method for an integrated circuit is provided. The integrated circuit includes a first processor and a second processor. The method includes: monitoring a first message transmitted from the second processor to the first processor; and controlling transmission of the first message based on a correspondence between the first message and a first preset protocol when the first message is monitored.

In the method provided in the present disclosure, in a case that the second processor transmits a first message to the first processor, transmission of the first message may be controlled based on a correspondence between the first message and a first preset protocol. In this way, the first processor is prevented from receiving a first message not in correspondence to the first preset protocol and thus is not stuck, thereby improving reliability of the integrated circuit.

According to a third aspect of the present disclosure, an integrated circuit system is provided. The integrated circuit system includes: an integrated circuit; and a memory, configured to store instructions executable by the integrated circuit. The integrated circuit is configured to read the executable instructions from the memory, and execute the instructions to implement any one of the foregoing methods.

According to a fourth aspect of the present disclosure, an electronic device is provided. The electronic device includes the integrated circuit provided in the first aspect.

According to the fifth aspect of the present disclosure, a non-transitory computer-readable storage medium is provided, in which a computer program is stored, wherein the computer program, when executed by a processor, causes the processor to implementing the communication method for an integrated circuit according to the second aspect.

DETAILED DESCRIPTION OF THE EMBODIMENTS

Figure 1:
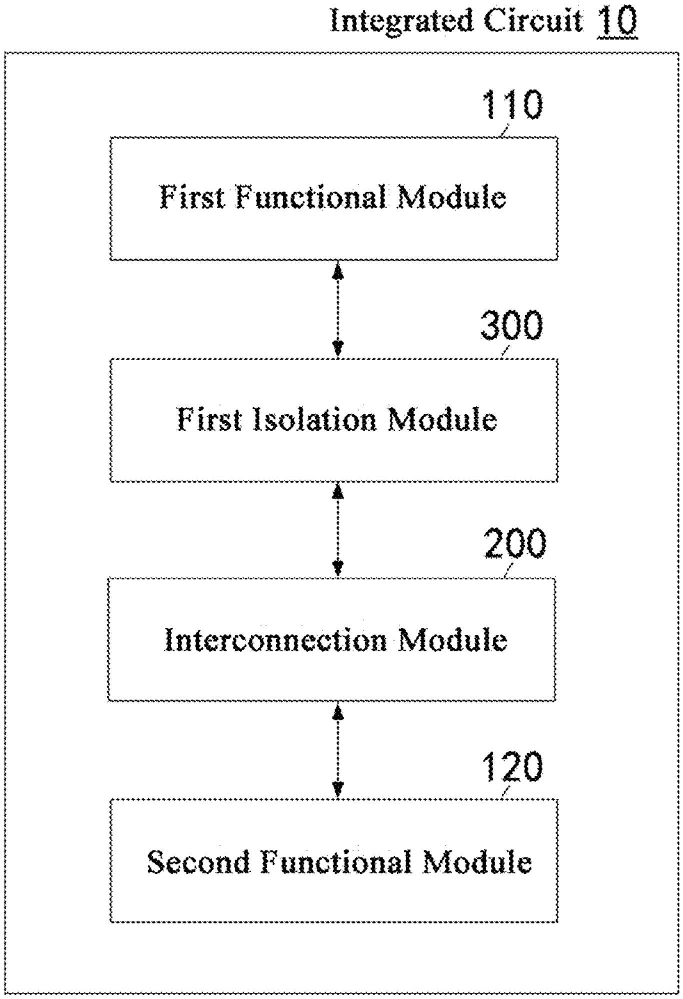
FIG. 1 is a schematic diagram of a first structure of an integrated circuit according to an exemplary embodiment of the present disclosure.

To explain the present disclosure, exemplary embodiments of the present disclosure will be described in detail below with reference to the accompanying drawings. Apparently, the described embodiments are merely some of embodiments of the present disclosure, rather than all of the embodiments of the present disclosure. It should be understood that, the present disclosure is not limited by the exemplary embodiments.

It should be noted that the relative arrangement of components and steps, numerical expressions, and numerical values set forth in these embodiments do not limit the scope of the present disclosure, unless otherwise specifically stated.

Before the embodiments of the present disclosure are described in detail, nouns and terms involved in the embodiments of the present disclosure are described first. The nouns and terms involved in the embodiments of the present disclosure are subject to the following interpretations.

1. Operating System, referring to a system for implementing service functions of intelligent vehicles. For example, each of an intelligent driving system, an intelligent cockpit system, an in-vehicle infotainment system, a safety island system and the like is an operating system with a different service function. Certainly, the present disclosure is not limited to the above-mentioned operating systems, but may also be other types of operating systems or operating systems not mentioned in the present disclosure.

The operating system is run by a processor within an integrated circuit. For operating systems with different performance requirements, different numbers of processors may be provided to run for them. For an operating system with a relatively high performance requirement, a relatively large number of processors may be provided to run for it. For an operating system with a relatively low performance requirement, a relatively small number of processors may be provided to run for it.

2. Integrated Circuit, including at least one processor, a communication link, a plurality of communication interfaces, a memory, and other hardware resources. The processor may involve different types, such as a central processing unit and a graphics processing unit.

In the embodiments of the present disclosure, the integrated circuit may be, for example, a system-on-a-chip (SoC) or an application processor (AP), which is not limited in the embodiments of the present application.

To run a plurality of operating systems simultaneously in the integrated circuit, the integrated circuit may include a plurality of integrated sub-circuits. Each integrated sub-circuit may include at least one processor, a corresponding communication link, a plurality of communication interfaces, a memory, and other hardware resources. In other words, each integrated sub-circuit may serve as a functional module, and each functional module may independently run one operating system. In this way, the integrated circuit may include a plurality of functional modules, thereby running a plurality of operating systems simultaneously.

In each functional module, the at least one processor may be configured to run a pre-assigned operating system. The communication link and the communication interface may be configured to implement communication between processors inside the functional module, or to implement communication between the functional module and other external modules. The memory may be configured to store information, such as storing information to be processed, intermediate information during processing, and result information after processing.

In addition, to implement and control data interaction between the plurality of functional modules, the integrated circuit may further include an interconnection module and an isolation module.

The interconnection module is configured to implement information transmission between the plurality of functional modules. The interconnection module includes a communication link and a plurality of communication interfaces connected to the communication link. Information may be transmitted between the plurality of communication interfaces in the interconnection module through the communication link. The communication interfaces of the interconnection module are each connected to the communication interfaces of the plurality of functional modules, respectively. Through each of the communication interfaces of the interconnection module, information is transmitted or received to or from different functional modules. In some examples, the plurality of functional modules of the integrated circuit may communicate with each other through a bus. Correspondingly, the interconnection module may be a bus in the integrated circuit.

The isolation module is a module newly added in the embodiments of the present disclosure. In the embodiments of the present disclosure, the isolation module is configured to securely isolate a module that needs to be protected in the integrated circuit. The isolation module includes a functional circuit for implementing a function related to security isolation and a communication interface. In the embodiments of the present application, the isolation module may isolate the module that needs to be protected into a secure and independent physical area on the hardware to form a secure world. In the secure world, input or output information needs to be checked and verified, before it can be determined whether to be transferred to another module.

In the embodiments of the present disclosure, the module that needs to be protected may be a functional module, or may be an interconnection module.

It is taken as an example that the module that needs to be protected is a target functional module in the integrated circuit. In this case, the isolation module may be provided at an interface, for communication, between the target functional module and another module. For example, the isolation module may be provided between a communication interface of the target functional module and the communication interface of the interconnection module. In this way, when information received and transmitted from and to the target functional module passes through the isolation module, the isolation module may check and verify the information and determine whether to continue transmission of the information.

3. security Level, for example, an automotive safety integrity level (ASIL). The security level may be determined according to indicators such as severity, exposure, controllability and the like. For example, the security level may be classified as a level quality management (QM), a level A, a level B, a level C, and a level D according to security requirements from low to high, where the level QM represents a level not causing vehicle safety hazard.

The security level is used for measuring a security requirement of each module in the integrated circuit. A higher security level needs to be configured for a module with a higher security requirement, and a lower security level needs to be configured for a module with a lower security requirement.

For example, the security of intelligent driving systems is related to the personal safety of drivers and passengers. Therefore, a functional module running an intelligent driving system has a relatively high requirement for security, and thus a relatively high security level may be configured for the functional module running the intelligent driving system. For another example, a functional module running an in-vehicle infotainment system has a relatively low requirement for security. Therefore, a relatively low security level may be configured for the functional module running the in-vehicle infotainment system. The above description of the security level of each module is only an example, and does not constitute a specific limitation on the security level of each module.

In addition, it should be additionally noted that, in the embodiments of the present application, because the modules (for example, the functional modules, the interconnection module, and the isolation module) each include a processor, a functional circuit, a communication link, a communication interface, and the like for implementing their respective functions, the modules may each is in correspondence to a hardware area in the integrated circuit, and the hardware area may also be referred to as a hardware domain. Exemplarily, the functional module may be referred to as a hardware domain; the interconnection module may be referred to as an interconnection domain; and the isolation module may be referred to as an isolation domain.

Application Overview

At present, intelligent vehicles typically integrate a series of operating systems with rich service functions, such as intelligent driving systems, intelligent cockpit systems, in-vehicle infotainment systems, safety island systems and the like.

At present, a plurality of operating systems may run in one integrated circuit. For example, the integrated circuit may include a plurality of integrated sub-circuits, and each integrated sub-circuit may serve as a functional (or referred to as service functional) module. In this way, the integrated circuit may include a plurality of functional modules, and each functional module may run one operating system. For example, a first integrated sub-circuit implements an intelligent driving function, and a second integrated sub-circuit implements a cockpit entertainment function. The first integrated sub-circuit may also be referred to as a first functional module or a first hardware domain. The second integrated sub-circuit may also be referred to as a second functional module or a second hardware domain.

During simultaneous running of the plurality of operating systems, data interaction may occur between different functional modules of the integrated circuit. When abnormal data is transmitted from one functional module to another functional module, the functional module receiving the abnormal data may enter a stuck state due to inability to identify the abnormal data. Consequently, an operating system on the functional module receiving the abnormal data cannot run normally, which reduces operation reliability of the integrated circuit.

To resolve the foregoing problem, the embodiments of the present disclosure provide an integrated circuit, an integrated circuit system, and a communication method, so that it may be avoided that a functional module in the integrated circuit is in a stuck state due to receiving of abnormal data, thereby improving reliability of the integrated circuit.

Exemplary System

FIG. 1 is a schematic diagram of a first structure of an integrated circuit according to an exemplary embodiment of the present disclosure. The integrated circuit 10 in FIG. 1 includes a first functional module 110, a second functional module 120, an interconnection module 200, and a first isolation module 300. The first functional module 110 is communicatively connected to the second functional module 120 through the interconnection module 200. The first isolation module 300 is disposed on a communication link between the first functional module 110 and the interconnection module 200.

For example, the interconnection module 200 and the first isolation module 300 may be physically one module or two different modules.

The first functional module 110 may implement a first service function by running software code corresponding to the first service function. The second functional module 120 may implement a second service function by running software code corresponding to the second service function.

For example, the first service function may be an intelligent driving function. In this case, the software code corresponding to the first service function may be software code of an intelligent driving system. The second service function may be an in-vehicle infotainment function. In this case, the software code corresponding to the second service function may be software code of an in-vehicle infotainment system.

In some embodiments, the first functional module 110 and the second functional module 120 each may have a preset security level. The security levels of the first functional module 110 and the second functional module 120 may be the same or different. The security levels of the first functional module 110 and the second functional module 120 may be static or dynamically adjusted based on the respective service functions. The security levels of the first functional module 110 and the second functional module 120 are not limited in this embodiment of the present application.

In some embodiments, the isolation module may provide security protection for one or more of the first functional module 110, the second functional module 120, and/or the interconnection module 200, for example, security isolation functions such as message checking and message blocking.

In some implementations, the isolation module and the protected module may have a one-to-one association relationship. In other words, an isolation module is correspondingly provided for each protected module. For example, if the protected module is the first functional module 110, an isolation module, for example, the first isolation module 300, needs to be provided for the first functional module 110. If the interconnection module 200 also needs to be protected, an isolation module further needs to be provided for the interconnection module 200, and so on.

In some other implementations, the isolation module and the protected module may have a one-to-multiple association relationship. In other words, one isolation module may provide protection for a plurality of modules. For example, in the structure shown in FIG. 1, the first isolation module 300 may provide protection for both the first functional module 110 and the interconnection module 200. Which specific module or modules the first isolation module 300 provides protection for may be determined based on a preset decision-making mechanism, for example, a security level, a protection priority, a service requirement, and/or a system configuration of each module, which is not limited in this embodiment of the present application.

In some embodiments, the isolation module may provide security protection preferentially for a functional module with a relatively high security level, so as to preferentially ensure that it is impossible that the functional module with the relatively high security level is stuck due to receiving of abnormal data.

For example, the first functional module 110 has a relatively high security level due to running of an intelligent driving system. For example, the security level of the first functional module 110 is ASIL D. The second functional module 120 has a relatively low security level due to running of an in-vehicle infotainment system. For example, the security level of the second functional module 120 is ASIL B. In other words, the security level of the first functional module 110 is higher than the security level of the second functional module 120.

Correspondingly, as shown in FIG. 1, because the security level of the first functional module 110 is relatively high, the first isolation module 300 may be configured for the first functional module 110. Because the security level of the second functional module 120 is relatively low, there is no need to configure an isolation module for the second functional module 120.

In addition, the function of the interconnection module 200 is also very important due to implementing of the communication between the first functional module 110 and the second functional module 120. Therefore, a relatively high security level may also be set for the interconnection module 200. For example, the security level of the interconnection module 200 may be set to ASIL C.

Correspondingly, an isolation module may also be configured for the interconnection module 200. For example, the interconnection module 200 may share the first isolation module 300 with the first functional module 110. Alternatively, an isolation module may be configured separately for the interconnection module 200, which is not specifically limited in this embodiment of the present application.

A manner in which the first isolation module 300 (e.g. a functional circuit in the first isolation module 300, like a first isolation circuit) provides security protection for the first functional module 110 is exemplarily described below with reference to FIG. 1 by using an example in which the second functional module 120 (e.g. a processor in the second functional module 120, like a second processor) transmits a first message to the first functional module 110 (e.g. a processor in the first functional module 110, like a first processor).

The first message may be an access request message transmitted from the second functional module 120 to the first functional module 110. Exemplarily, the first message includes, but is not limited to, any one or more of a write request message, a read request message, a synchronization request message, a lock request message, and the like.

Alternatively, the first message may be a response message transmitted from the second functional module 120 to the first functional module 110 after the second functional module 120 receives an access request message transmitted from the first functional module 110. Exemplarily, the first message includes, but is not limited to, any one or more of a write response message, a read response message, a synchronization response message, a lock response message, and the like.

In an example in which the first message is an access request message, in a case that the first isolation module 300 is not provided, the first message is transmitted from the second functional module 120 and then delivered to the first functional module 110 through the interconnection module 200 (e.g., bus). If the first message complies with a first preset protocol, the first functional module 110 may transmit a response message to the second functional module 120, thereby the interaction and communication between the first functional module 110 and the second functional module 120 are completed.

In an example in which the first message is a response message, in a case that the first isolation module 300 is not provided, the first message is transmitted from the second functional module 120 and then delivered to the first functional module 110 through the interconnection module 200, thereby the interaction and communication between the first functional module 110 and the second functional module 120 are completed.

However, regardless of whether the first message is an access request message or a response message, as long as the first message received by the first functional module 110 does not comply with the first preset protocol, the first functional module 110 may be stuck.

It should be additionally noted that, the first message complying with the first preset protocol may also be described as that the first message is in correspondence to the first preset protocol, or that the first message is a legal message, a request corresponding to the first message is a legal request, and a response corresponding to the first message is a legal response. Correspondingly, the first message not complying with the first preset protocol may also be described as that the first message is not in correspondence to the first preset protocol, or that the first message is an illegal message, a request corresponding to the first message is an illegal request, and a response corresponding to the first message is an illegal response.

In an example, the first preset protocol may define a manner in which data is transmitted between modules. For example, in the first preset protocol, a number of data in the first message may be preset to be equal to a target number (or a target quantity). For example, the first protocol defines specifically that the number of data in the first message is N, where $N \geq 1$. The data is transmitted in a manner of beats. Each beat may include a specified length of data, and each data transmission may include a plurality of beats. Each beat may be considered as one piece of data. In other words, the number of beats is the number of data. For example, before the second functional module 120 transmits the first message to the first functional module 110, the second functional module 120 may first transmit an indication message to the first functional module 110. The indication message may include a number of beats that should be included in the first message to be transmitted, that is, the target number of data, and a data length per beat. After receiving the indication message, the first functional module 110 may enter a suspended state, waiting for receiving of the data. The second functional module 120 may transmit the first message to the first functional module 110 by beats. Next, if the target number of beats are received by the first functional module 110, that is, the number of data in the first message is the same as the target number, it indicates that the first message is in correspondence to the first preset protocol; and if the number of beats received by the first functional module 110 is different from the target number, that is, if the number of data in the first message is different from or is not equal to the target number, it indicates that the first message is not in correspondence to the first preset protocol.

To prevent the first functional module 110 from being stuck due to reception of a message that does not comply with the first preset protocol, in this embodiment of the present application, the first isolation module 300 is provided between the first functional module 110 and the interconnection module 200. When the first message is received by the first isolation module 300, that is, before the first message is transmitted to the first functional module 110, the first isolation module 300 may control transmission of the first message based on a correspondence between the first message and the first preset protocol.

Specifically, in a case that the first message is not in correspondence to the first preset protocol, the first isolation module 300 may block the first message. In this way, the first functional module 110 is prevented from receiving the first message and thus is not stuck, thereby security isolation of different functional modules being achieved well.

In addition, in a case that the first message is in correspondence to the first preset protocol, the first isolation module 300 may continue transmission of the first message, for example, transparent transmission of or transmission of the first message, upon performing of a preset processing on the first message, to the first functional module 110. The preset processing may include, for example, timing control, flow control, prioritization, and arbitration, which is not limited in this embodiment of the present disclosure. In this way, the first message may be received by the first functional module 110, for completing of subsequent interaction and communication. The "transparent transmission" herein means that the first isolation module 300 may not make any modifications to the first message, but is only responsible for transmitting the first message to the first functional module 110.

In this embodiment of the present disclosure, a preset protocol (for example, the first preset protocol or a second preset protocol) is related to a bus architecture standard used for communication between functional modules (for example, between the first functional module 110 and the second functional module 120). For example, the first preset protocol may comply with a bus architecture standard used between the first functional module 110 and the second functional module 120. In other words, the first preset protocol is designed based on the bus architecture standard used between the first functional module 110 and the second functional module 120.

Exemplarily, an advanced microcontroller bus architecture (AMBA) standard is used between the first functional module 110 and the second functional module 120. In this case, the first preset protocol may comply with any one of an advanced peripheral bus (APB) standard, an advanced high-performance bus (AHB) standard, and an advanced extensible interface (AXI) standard.

Exemplarily, depending on the bus architecture standard used between the first functional module 110 and the second functional module 120, content of the bus architecture standard includes, but is not limited to, at least one of the following:

- a data volume requirement of a message: including the number of data, such as, the number of beats; and/or a data length, such as, a byte length or a bit length;
- a timeout mechanism of a message: including a timeout duration, or the like;
- a timing requirement of a message: including restrictions on a number of clock cycles of the message, a signal latency, or the like; and
- error handling: defining an error type and a handling mechanism for an error that may occur during message transmission, or the like.

Exemplarily, if the bus architecture standard used between the first functional module 110 and the second functional module 120 includes a data volume requirement of a message, the first preset protocol may define that the number of data in the first message is equal to the target number N, where N≥1. In this case, if the number of data in the first message is not equal to the target number in the first preset protocol, it indicates that the first message is not in correspondence to the first preset protocol; and if the number of data in the first message is equal to the target number in the first preset protocol, it indicates that the first message is in correspondence to the first preset protocol. The target number may be fixed or may change dynamically in each transmission based on factors such as a requirement on a volume of data to be transmitted, which is not limited in this embodiment of the present disclosure.

Exemplarily, if the bus architecture standard used between the first functional module 110 and the second functional module 120 includes a number of clock cycles for a message, the first preset protocol may define that the number of clock cycles for transmitting the first message is less than or equal to a maximum number M of clock cycles, where M≥1. In this case, if the number of clock cycles for transmitting the first message is greater than the maximum number of clock cycles, it indicates that the first message is not in correspondence to the first preset protocol; and if the number of clock cycles for transmitting the first message is less than or equal to the maximum number of clock cycles, it indicates that the first message is in correspondence to the first preset protocol.

In some embodiments, the first preset protocol may be stored in a preset register 330. In this case, the first isolation module 300 may read the first preset protocol from the register 330, to determine content in the first preset protocol, and thus determine whether the first message is in correspondence to the first preset protocol.

The register 330 may be located inside the integrated circuit 10 and constitute part of the integrated circuit 10. Alternatively, the register 330 may be an external register 330 located outside the integrated circuit 10. When the register 330 is located inside the integrated circuit 10, the register 330 may be a register 330 exclusively used by the first isolation module 300, or may be a register 330 shared with another module, for example, shared with the first functional module 110, the second functional module 120, and/or the interconnection module 200. An implementation of the register 330 is not specifically limited in the present application.

In addition, when the register 330 is located inside the integrated circuit 10, the register 330 may be provided inside the first isolation module 300 as part of the first isolation module 300. Certainly, the register 330 may alternatively be provided in the integrated circuit 10 separately, without belonging to any module. In addition, the register 330 may alternatively be provided in another module, for example, in the first functional module 110, the second functional module 120, the interconnection module 200, or another isolation module. A location of the register 330 is not specifically limited in this embodiment of the present disclosure.

In addition, there may be one or more registers 330. When there are more than one register 330, the more than one register 330 may be provided in a plurality of manners. For example, the more than one register 330 may all be provided in the first isolation module 300. Alternatively, the more than one register 330 may all be provided in another module. Alternatively, the more than one register 330 may all be disposed separately in the integrated circuit 10, without belonging to any module. Alternatively, a portion of the more than one register 330 may be provided in the first isolation module 300, and another portion may be provided in another module or disposed separately. In other words, in a case that there are more than one register 330, a manner in which the registers 330 are provided is not specifically limited in this embodiment of the present disclosure.

It may be learned from the foregoing technical solution that, in the integrated circuit 10 provided in the present disclosure, in a case that the second functional module 120 transmits a first message to the first functional module 110, for example, before the first message is received by the first functional module 110, the first isolation module 300 may control transmission of the first message based on a correspondence between a first preset protocol and the first message. In this way, the first functional module 110 is prevented from receiving a first message not in correspondence to the first preset protocol and thus is not stuck, thereby security isolation of different functional modules being achieved well and reliability of the integrated circuit 10 being improved.

It should be noted that, the integrated circuit 10 shown in FIG. 1 is only exemplary. The number of functional modules, the number of isolation modules, and whether an operating system runs in a functional module may be set according to actual situations. The circuit structure of the integrated circuit 10 in FIG. 1 is only an example, and FIG. 1 cannot limit the protection scope of the present disclosure.

Exemplary Apparatus

Figure 2:
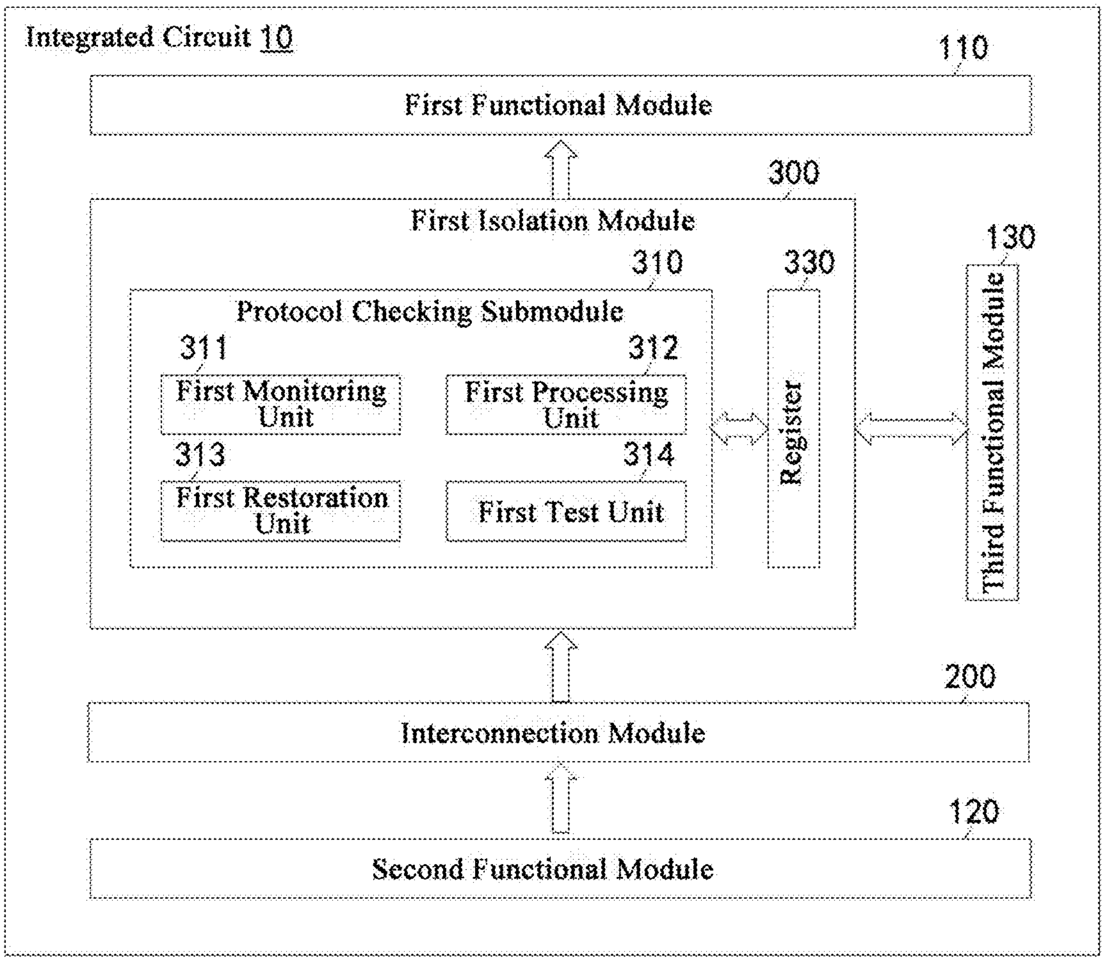
FIG. 2 is a schematic diagram of a second structure of an integrated circuit according to an exemplary embodiment of the present disclosure.

FIG. 2 is a schematic diagram of a second structure of the integrated circuit 10 according to an exemplary embodiment of the present disclosure.

As shown in FIG. 2, in some embodiments, the first isolation module 300 (e.g. the first isolation circuit in the first isolation module 300) may include a protocol checking submodule 310. The protocol checking submodule 310 may perform functions, for example, perform message monitoring on a message passing through the first isolation module 300, perform protocol checking on the monitored message, and/or control transmission of a message based on a protocol checking result. The protocol checking submodule 310 may include a functional circuit for implementing its function and a communication interface. When the first message transmitted from the second functional module 120 to the first functional module 110 passes through the first isolation module 300, the protocol checking submodule 310 may monitor the first message, and continue or block transmission of the first message based on the correspondence between the first message and the first preset protocol. In this way, the first functional module 110 is prevented from receiving a first message not in correspondence to the first preset protocol and thus is not stuck. Continuing transmission of the first message may include transparent transmission of the first message, or transmission of the first message, upon performing of a preset processing on the first message, to the first functional module 110. The "transparent transmission" herein means that the protocol checking submodule 310 may not make any modifications/processing to the first message, but is only responsible for transferring the first message to the first functional module 110.

Further, as shown in FIG. 2, in an embodiment, the protocol checking submodule 310 may include a first monitoring unit 311 and a first processing unit 312. In an example, the units, for example, the first monitoring unit 311 and the first processing unit 312, in the protocol checking submodule 310 may be two different functional sub-circuits in the protocol checking submodule 310. The first monitoring unit 311 may be communicatively connected to the first processing unit 312 through the communication interface in the protocol checking submodule 310. An implementation of the first monitoring unit 311 and the first processing unit 312 is not limited in this embodiment of the present application.

The first monitoring unit 311 may monitor, based on the first preset protocol, a message passing through the first isolation module 300.

In an implementation, the first monitoring unit 311 may acquire the first preset protocol from the register 330 in advance to determine a monitoring policy for message. The first monitoring unit 311 may acquire the first preset protocol from the register 330 when powered on, or the first monitoring unit 311 may periodically acquire the first preset protocol from the register 330, or the first monitoring unit 311 may acquire the first preset protocol from the register 330 based on an externally input control signal or externally input indication information, which is not limited in this embodiment of the present application.

In an example, the monitoring policy for message of the first monitoring unit 311 may include: monitoring one or more channels in a bus architecture standard that the first preset protocol complies with. The channel may refer to a logical path used for transmission of different types of data during bus transmission.

Exemplarily, an AXI standard may include channels as below: a master channel, a slave channel, a write data channel, a read data channel, a write address channel, a read address channel, a write response channel, and a read response channel.

It should be noted herein that, a host interface may be a communication interface of the first functional module 110, and a slave interface may be a communication interface of the second functional module 120; or a slave interface may be a communication interface of the first functional module 110, and a host interface may be a communication interface of the second functional module 120. Specifically, this may be flexibly configured in the register 330 according to the design of the bus, and is not limited in this embodiment of the present application.

Exemplarily, in a case that the security level of the first functional module 110 is higher than the security level of the second functional module 120, the host interface may be the communication interface of the second functional module 120, and the slave interface may be the communication interface of the first functional module 110.

Next, the first monitoring unit 311 may determine the correspondence between the first message and the first preset protocol when the first message transmitted from the second functional module 120 is monitored.

Exemplarily, the first message is a write request message. In this case, if the write request message transmitted from the second functional module 120 to the first functional module 110 is monitored on a write data channel by the first monitoring unit 311, the first monitoring unit 311 may detect whether a number of data to be written is the same as the target number in the first preset protocol. If yes, it is determined that the first message is in correspondence to the first preset protocol; and if no, it is determined that the first message is not in correspondence to the first preset protocol.

A manner in which the first monitoring unit 311 determines the correspondence between the first message and the first preset protocol is exemplarily described below by using an example in which the first message is a write request message and the first preset protocol complies with the AXI standard.

The content of the AXI standard may include at least:

an address of the first beat of the burst: an address of the first beat in a write/read data operation, where if the operation is a write data operation, the address is a write address; and if the operation is a read data operation, the address is a read address;

a number of beats (transfers) inside the burst: a target number of beats in a write/read data operation, that is, a target number of data; or a size per beat: a data length per beat.

Figure 3:
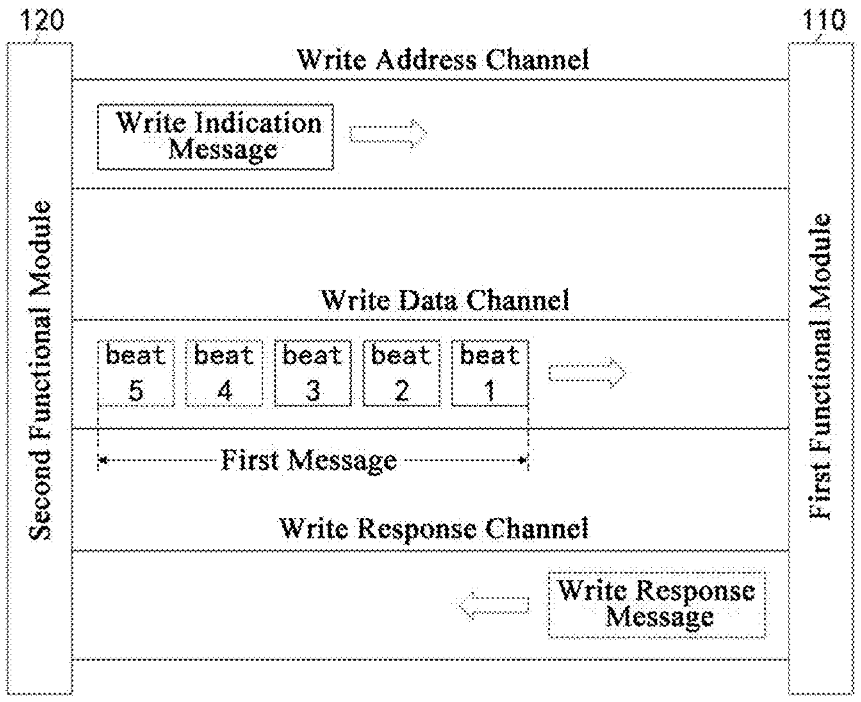
FIG. 3 is a schematic diagram of data interaction between modules according to an exemplary embodiment of the present disclosure.

FIG. 3 is a schematic diagram of data interaction between modules according to an exemplary embodiment of the present disclosure.

A manner in which the second functional module 120 transmits the first message to the first functional module 110 is exemplarily described below with reference to FIG. 3 by using an example in which the first message is a write request message and the first preset protocol complies with an AXI standard. For example, the first preset protocol defines that the number of data in the first message is equal to five beats.

Exemplarily, before the second functional module 120 transmits the first message to the first functional module 110, the second functional module 120 may transmit a write indication message to the first functional module 110 through a write address channel.

The write indication message may include a write address (starting address) of a first beat in the first message to be written, a data length (transfers size) per beat in the first message, and a number of beats (transfers length) in the first message.

For example, the write indication message may specifically include the following parameters:

starting address: 0x1004//the write address of the first beat is 0x1004 transfers size: 4 Bytes//a data length per beat is 4 bytes transfers length: 5 beats//the number of beats is 5 (namely, the target number)

In other words, the first preset protocol may be carried in the write indication message. For example, the write indication message including "transfers length: 5 beats" indicates that the first preset protocol defines that the transfers length of the first message is equal to 5, that is, the first preset protocol defines that the number of data in the first message is equal to 5 beats.

After receiving the write indication message, the first functional module 110 may enter a suspended state, waiting for receiving of the data.

Next, the second functional module 120 may transmit the first message to the first functional module 110 through a write data channel.

Exemplarily, if the first message transmitted from the second functional module 120 complies with the first preset protocol, the first message includes 5 beats, and a data length per beat is 4 bytes; and if the first message transmitted from the second functional module 120 does not comply with the first preset protocol, the first message may include only 3 or even fewer beats, or a data length per beat may not be 4 bytes.

Next, the first functional module 110 may detect the number of the received beats, and determine, based on the parameter "transfers length" in the write indication message, whether all of the beats in the first message are received. If all of the beats in the first message are received, the first functional module 110 may release the suspended state, and transmit a response message to the second functional module 120 through a write response channel; and if all of the beats in the first message are not received, the first functional module 110 may continue to remain in the suspended state, waiting for receiving of the remaining beats.

Exemplarily, assuming that the transfers length is 5 beats, if 5 beats of data are received by the first functional module 110, the first functional module 110 may determine that all of the beats in the first message are received; and if the first functional module 110 receives only 3 beats of data, the first functional module 110 may determine that all of the beats in the first message are not received.

Correspondingly, the first monitoring unit 311 may monitor the write address channel and the write data channel of the AXI standard. Through monitoring the write address channel, the write indication message transmitted from the second functional module 120 may be monitored, and thus a specific value, namely, the target number, in the parameter "transfers length" corresponding to the first message is determined. Through monitoring the write data channel, the first message transmitted from the second functional module 120 may be monitored, and thus the correspondence between the first message and the first preset protocol is determined according to the monitored parameter "transfers length" and the monitored number of beats in the first message.

Exemplarily, in a case that the transfers length is 5 beats, if it is monitored by the first monitoring unit 311 that the first message includes 5 beats of data, the first monitoring unit 311 may determine that the first message is in correspondence to the first preset protocol; and if it is monitored by the first monitoring unit 311 that the number of beats in the first message is not 5, for example, the first message includes 3 beats of data, the first monitoring unit 311 may determine that the first message is not in correspondence to the first preset protocol.

Next, in a case that the first monitoring unit 311 has determined the correspondence between the first message and the first preset protocol, the first processing unit 312 controls transmission of the first message based on the correspondence between the first message and the first preset protocol.

In an implementation, the first processing unit 312 may transmit (for example, transparently transmit) the first message to the first functional module 110 in a case that the first message is in correspondence to the first preset protocol. In this way, the first functional module 110 may receive and process the first message that is in correspondence to the first preset protocol.

In an implementation, the first processing unit 312 may block the first message in a case that the first message is not in correspondence to the first preset protocol. In this way, the first functional module 110 is prevented from receiving the first message not in correspondence to the first preset protocol and thus is not stuck, thereby security isolation of different functional modules being achieved well.

In an implementation, in a case that the first message is not in correspondence to the first preset protocol, the first monitoring unit 311 may further determine an error type of the first message. For example, if the number of data to be written in the first message is less than the target number, the error type may be unmatch of the number of data, for example, insufficiency of the number of data; and if the number of data to be written in the first message is greater than the target number, the error type may be unmatch of the number of data, for example, excess of the number of data. If a data total length of the first message is different from a target data total length in the first preset protocol, the error type may be unmatch of the data length of the data, for example, insufficiency of the data length of the data or excess of the data length of the data. In a case that the first message is a response message, if the first message is not received for a first duration from when a request message transmitted, the error type may be timeout.

In this embodiment of the present application, the error type may be preconfigured in the register 330. A number and content of error types are not limited in this embodiment of the present application.

In an implementation, in a case that the first message is not in correspondence to the first preset protocol, the first processing unit 312 may process the first message according to different policies based on different error types of the first message.

In a first example, for any of the error types, the first processing unit 312 may block the first message.

In a second example, if the number of data in the first message is different from the target number preset in the first preset protocol, the first processing unit 312 determines and transmits a first association message to the first functional module based on the first preset protocol, where a number of data in the first association message is equal to the target number preset in the first preset protocol. For example, if the error type of the first message is insufficiency of the number of data, the first processing unit 312 may block the first message, replenish the number of data in the first message to the target number to obtain the first association message, and transmit the first association message to the first functional module 110.

For example, it is assumed that the first preset protocol defines that the target number of the first message is 10 pieces of data, but the first message includes only 5 pieces of data. In this case, it may be determined that the number of data in the first message is less than the target number. In this case, the first processing unit 312 may block the first message, add 5 pieces of data to the 5 pieces of data in the first message to obtain a first association message including 10 pieces of data, and then, transmit the first association message to the first functional module 110.

Figure 4:
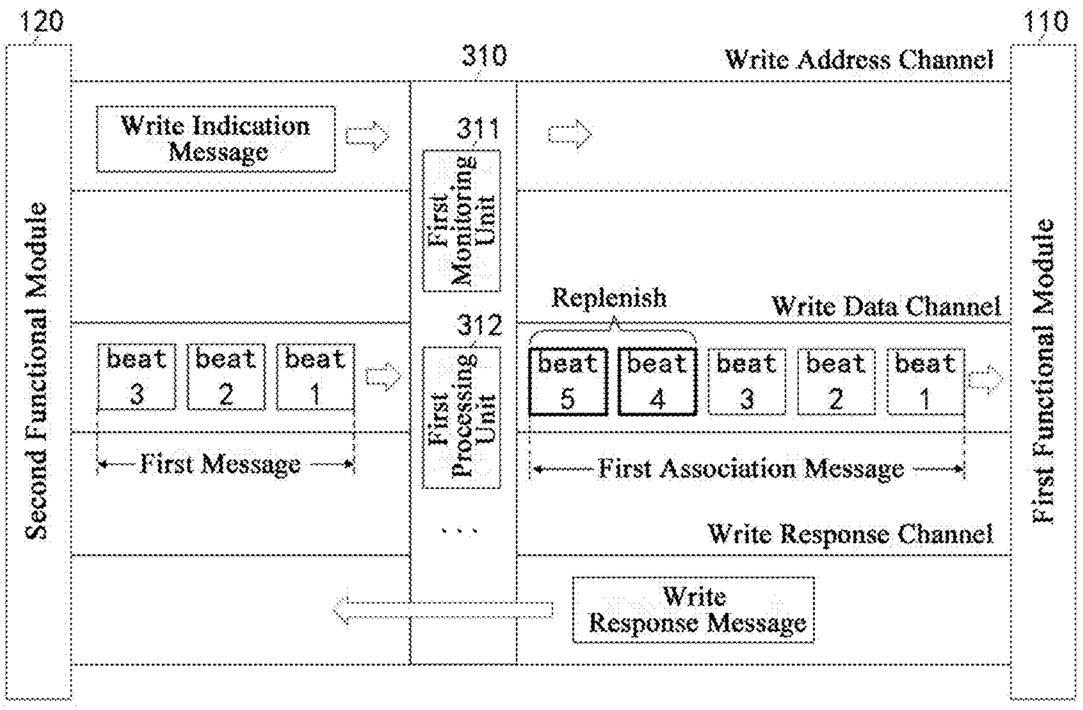
FIG. 4 is a schematic diagram of control of transmission of a first message according to an exemplary embodiment of the present disclosure.

FIG. 4 is a schematic diagram of control of transmission of a first message according to an exemplary embodiment of the present disclosure.

A manner in which the first processing unit 312 transmits the first association message is exemplarily described below with reference to FIG. 4 by using an example in which the first message is a write request message, and the first preset protocol complies with an AXI standard.

Exemplarily, in a case that the transfers length is 5 beats, that is, the target number is 5 pieces of data, if it is monitored by the first monitoring unit 311 that the number of beats in the first message is less than 5, for example, the first message includes 3 beats of data, the first processing unit 312 may block the first message, replenish 2 beats of data according to the 3 beats of data in the first message to obtain a first association message including 5 beats of data, and transmit the first association message including the 5 beats of data to the first functional module 110.

In other words, the first processing unit 312 may replace the first message in which the number of data is less than the target number with the first association message in which the number of data is equal to the target number, so as to meet the requirement of the target number in the first preset protocol. In this way, the first functional module 110 receives the first association message in which the number of data complies with the first preset protocol and thus is not stuck, thereby security isolation of different functional modules being achieved well and reliability of the integrated circuit 10 being improved.

It should be additionally noted herein that, the first processing unit 312 does not know correct content of the 5 pieces of missing data in the first message. In this case, the first processing unit 312 may replenish the missing data according to preset content, such as adding meaningless data preconfigured in the register 330 or adding blank data with content of all zeroes. Specific content of the data added by the first processing unit 312 is not limited in this embodiment of the present application.

It may be understood that, because the first preset protocol defines the target number of data in the message but does not define specific content of the message, as long as the target number of data are received by the first functional module 110 during data reception, it is considered based on the first preset protocol that all of the data complying with the first preset protocol has been received from the second functional module 120. Therefore, the first functional module 110 may release the suspended state of waiting for receiving of data and thus be not stuck, thereby security isolation of different functional modules being achieved well.

For example, assuming that the target number is 10 pieces of data, if the first functional module 110 receives a first association message including 10 pieces of data, it may be considered that it has received all the data complying with the first preset protocol. Therefore, the first functional module 110 may release the suspended state and thus is not stuck, thereby security isolation of different functional modules being achieved well.

In a third example, if the error type of the first message is insufficiency of the number of data, the first processing unit 312 may, first transparently transmit the first message, instead of blocking the first message, and then transmit a particular number of added data to the first functional module 110 upon transparent transmission of the first message, so that a sum of the number of data in the first message and the number of added data is equal to the target number. The added data may be meaningless data preconfigured in the register 330, blank data with content of all zeroes, or the like, which is not limited in this embodiment of the present application. In this way, it is also possible to make the number of data received by the first functional module 110 meet a requirement of the first preset protocol, and thus the first functional module 110 is not stuck, thereby security isolation of different functional modules being achieved well.

In a fourth example, if the error type of the first message is excess of the number of data, the first processing unit 312 may block the first message, cut out the target number of data from the first message to obtain a first association message, and transmit the first association message to the first functional module 110.

Exemplarily, based on an order of all pieces of data in the first message, the first processing unit 312 may cut out the first target number of data from the first message; or may cut out the last target number of data from the first message; or may cut out the middle target number of data from the first message. Alternatively, the first processing unit 312 may select the target number of data from the first message based on a particular rule, such as selecting the target number of data from the first message at dynamically variable or fixed intervals, or pulling out the target number of data from the first message randomly. A manner in which the target number of data is cut out from the first message is not specifically limited in this embodiment of the present disclosure.

In this way, after receiving the first association message, the first functional module 110 may consider that all data complying with the first preset protocol have been received from the second functional module 120. Therefore, the first functional module 110 may release the suspended state of waiting for receiving of data and thus is not stuck, thereby security isolation of different functional modules being achieved well.

In a fifth example, if the error type of the first message is excess of the number of data, the first processing unit 312 may transparently transmit the target number of data in the first message, and block the remaining data, so that a number of data actually received by the first functional module 110 meet a requirement of the first preset protocol, and thus the first functional module 110 is not stuck, thereby security isolation of different functional modules being achieved well.

With reference to the second to the fifth examples, the first processing unit 312 may transmit a related association message, for example, the first association message, to the first functional module 110 in a case that the number of data in the first message is different from the target number, where a number of data in the first association message is equal to the target number, so that the number of data received by the first functional module 110 meet the requirement of the first preset protocol, and thus the first functional module 110 is not stuck, thereby security isolation of different functional modules being achieved well.

In a sixth example, if the error type of the first message is unmatch of a data length of data, the first processing unit 312 may block the first message, replenish the data total length of the data in the first message to be equal to the target data total length to obtain the first association message, and transmit the first association message to the first functional module 110.

The data total length, such as the data total length of the data in the first message and the target data total length, may be a byte length or a bit length. Certainly, the data total length may alternatively be expressed in another manner. An implementation of the data total length is not specifically limited in this embodiment of the present disclosure.

For example, assuming that the data total length is a bit length, if the first preset protocol defines that the target data total length of the first message is 32 bits, but the data total length of the first message is only 20 bits, it may be determined that the data total length of the data in the first message is less than the target data total length. In this case, the first processing unit 312 may block the first message, add 12 bits of data to the 20-bit data total length of the first message to obtain a first association message with a data total length of 32 bits, and then, transmit the first association message to the first functional module 110.

It should be additionally noted herein that, each error type and a processing manner or a handling policy for each error type may be prestored in the register 330. For example, the register 330 may include a table of a correspondence between error types and processing manners. The first processing unit 312 may look up the register 330 for a corresponding processing manner based on an error type, so as to control the first message.

In some embodiments, the integrated circuit 10 may further include a third functional module 130. The third functional module 130 may be, for example, a microcontroller unit (MCU) in which a security function is integrated, such as a security island MCU. The third functional module 130 may include a hardware encryption engine, a secure storage area, an isolation mechanism, a secure boot function, and the like, so as to protect a system against various threats, including software attacks and hardware attacks, thereby improving system security.

The third functional module 130 may establish a communication connection with the first isolation module 300 through a communication interface.

In an implementation, the first monitoring unit 311 may transmit first error information to the third functional module 130 in a case that the first message is not in correspondence to the first preset protocol.

The first error information may include an identifier of the second functional module 120, an error type, and/or an error occurrence time, and the like. Exemplarily, the identifier of the second functional module 120 may be, for example, a module ID (for example, a hardware domain ID), a serial number, a universally unique identifier or the like, which is not limited in this embodiment of the present application.

In an example, the first error information may include specific content of the error type of the first message. In this case, a large amount of data are transmitted from the first monitoring unit 311 to the third functional module 130, which is not conducive to improving the efficiency of communication between the first monitoring unit 311 and the third functional module 130.

In another example, to improve the efficiency of communication between the first monitoring unit 311 and the third functional module 130, a corresponding error code may be preset for each error type. In this way, the first error information needs to include only an error code corresponding to the error type of the first message, instead of the specific content of the error type of the first message, thereby the amount of data transmitted being reduced and the efficiency of communication between the first monitoring unit 311 and the third functional module 130 being improved.

Exemplarily, the correspondence between error types and error codes may be shown in Table 1:

TABLE 1

| Error Code | Error Type |
|---|---|
| 0 | Insufficiency of the Number of Data |
| 1 | Excess of the Number of Data |
| 2 | Insufficiency of the Data Length of Data |
| 3 | Excess of the Data Length of Data |
| 4 | Timeout |
| . . . | . . . |

Exemplarily, the correspondence between error types and error codes may be prestored in the register 330. The first monitoring unit 311 may acquire a corresponding error code from the register 330 in a case that the error type of the first message is determined, thereby generating first error information.

For example, a first relationship table, for example, Table 1, recording the correspondence between error types and error codes may be prestored in the register 330. In this way, the first monitoring unit 311 may look up the first relationship table for the corresponding error code in a case that the error type of the first message is determined. The first relationship table may be a relationship table associated to the first monitoring unit 311. In other words, the first relationship table is exclusively used by the first monitoring unit 311. In addition, the first relationship table may alternatively be a relationship table that is not associated to the first monitoring unit 311. In other words, the first relationship table may be used not only by the first monitoring unit 311 but also by other units and modules. An association relationship between the first relationship table and the first monitoring unit 311 is not specifically limited in this embodiment of the present disclosure.

In another implementation, the first monitoring unit 311 may write first error information into the register 330 in a case that the first message is not in correspondence to the first preset protocol, and transmit a first interrupt signal to the third functional module 130. The first interrupt signal may be a hardware signal or a software signal.

In an example in which the first interrupt signal is a hardware signal, the third functional module 130 may include a first hardware interface for receiving of an external hardware interrupt signal, and the first monitoring unit 311 may be communicatively connected to the first hardware interface of the third functional module 130. In an example, the first interrupt signal may be a high level signal. In this case, when the first interrupt signal is not transmitted, the first monitoring unit 311 inputs a low level to the first hardware interface of the third functional module 130; and when the first interrupt signal is transmitted, the first monitoring unit 311 inputs a high level to the first hardware interface of the third functional module 130. In another example, the first interrupt signal may be a low level signal. In this case, when the first interrupt signal is not transmitted, the first monitoring unit 311 inputs a high level to the first hardware interface of the third functional module 130; and when the first interrupt signal is transmitted, the first monitoring unit 311 inputs a low level to the first hardware interface of the third functional module 130.

An implementation of the first interrupt signal is not specifically limited in this embodiment of the present application.

Next, when the first interrupt signal transmitted from the first monitoring unit is received, the third functional module 130 acquires the first error information from the register 330 in response to the first interrupt signal.

It may be understood that, in a case that a history message (for example, the first message) transmitted between the first functional module 110 and the second functional module 120 is not in correspondence to the first preset protocol, the register 330 may also include error information corresponding to the history message. In other words, when the first interrupt signal is received, the third functional module 130 may acquire, from the register 330, not only the first error information corresponding to the first message but also other error information corresponding to the history message. In this way, richer error information is acquired by the third functional module 130, helping the third functional module comprehensively analyze error causes by using the first error information and other error information corresponding to the history message, thereby improving a success rate of error locating.

What specific information the third functional module 130 may acquire may depend on a policy for acquiring information by the third functional module 130 and the configuration in the register 330, which is not limited in this embodiment of the present application.

In an example, when the first interrupt signal is received, the third functional module 130 may acquire all error information from the register 330.

In another example, the register 330 may store error information in a manner of a first-in-first-out (FIFO) queue. When the first interrupt signal is received, the third functional module 130 may acquire error information from a tail of the FIFO queue, that is, acquire the first information that has been written lastestly, that is, the first error information.

It can be learned that, in an implementation, the first monitoring unit 311 may transmit the first error information directly to the third functional module 130, so that the first error information is received directly by the third functional module 130. In another implementation, instead of transmitting the first error information directly to the third functional module 130, the first monitoring unit 311 may alternatively transmit the first interrupt signal to the third functional module 130, and the third functional module 130 acquires the first error information from the register 330. In this way, an amount of data transmitted between the first monitoring unit 311 and the third functional module 130 is reduced, thereby the efficiency of communication between the first monitoring unit 311 and the third functional module 130 being improved.

Next, when the first error information is acquired, the third functional module 130 may determine a corresponding handling policy based on an error type of the first error information, and execute the corresponding handling policy, such as restarting or resetting the second functional module 120, to cause the second functional module 120 to be restored from an abnormal state to a normal state, so as to prevent the error from occurring again or to reduce an occurrence frequency of the error. In some implementations, the handling policy of the third functional module 130 may alternatively be set by a user, which is not limited in this embodiment of the present disclosure.

In an embodiment, the protocol checking submodule 310 may further include a first restoration unit 313. Upon the control of transmission of the first message being completed by the protocol checking submodule 310, for example, after the first processing unit blocks the first message or transmits the first message to the first functional module, the first restoration unit 313 restores the first monitoring unit 311 and the first processing unit 312 to an enabled state, so that the protocol checking submodule 310 starts a new round of monitoring and processing functions.

The control of transmission of the first message being completed by the protocol checking submodule 310 may include:

blocking of the first message being completed by the first processing unit 312 in a case that the first message is not in correspondence to the first preset protocol; alternatively, transparent transmission of the first message being completed by the first processing unit 312 in a case that the first message is in correspondence to the first preset protocol; alternatively, transmission of a first association message to the first functional module 110 being completed by the first processing unit 312 in a case that the number of data in the first message is different from the target number; and alternatively, transmission of first error information to the third functional module 130 being completed by the first monitoring unit 311 in a case that the first message is not in correspondence to the first preset protocol.

In other words, after the units of the protocol checking submodule 310 complete their respective functions based on the correspondence between the first message and the first preset protocol, it may be determined that the control of transmission of the first message is completed by the protocol checking submodule 310.

It should be noted herein that, during the period in which the units of the protocol checking submodule 310 perform their respective functions based on the correspondence between the first message and the first preset protocol, the protocol checking submodule 310 does not monitor or control transmission of another message. In other words, during this period, the units of the protocol checking submodule 310 are in a disabled state, or in a busy state.

Upon the control of transmission of the first message being completed by the protocol checking submodule 310, the first restoration unit 313 may restore or reset the units in the protocol checking submodule 310, for example, the first monitoring unit 311 and the first processing unit 312, to an enabled state or an idle state, in order to enable the protocol checking submodule 310 to control transmission of other subsequent messages. In this way, subsequently, if there is a message that needs to be processed by the protocol checking submodule 310, the protocol checking submodule 310 may continue to perform a corresponding function, so as to implement control of transmission of the message.

In this embodiment of the present application, in a case that the first message is not in correspondence to the first preset protocol, the first monitoring unit 311 may transmit first error information or a first interrupt signal to the third functional module 130. In this case, if the first error information or the first interrupt signal is never received by the third functional module 130, it usually means that there is no such case that the first message is not in correspondence to the first preset protocol. However, it may be possible that a function of the protocol checking submodule 310 is abnormal. The function of the protocol checking submodule 310 being abnormal may include, for example, that the first monitoring unit 311 cannot monitor the first message, or that the first monitoring unit 311 cannot normally transmit the first error information or the first interrupt signal. However, the third functional module 130 is not aware of a specific reason why the first error information or the first interrupt signal is not received. In other words, the third functional module 130 is not aware of whether the function of the protocol checking submodule 310 is normal.

In an embodiment, to enable the third functional module 130 to be aware of whether the function of the first monitoring unit 311 is normal, the protocol checking submodule 310 further includes a first test unit 314.

The first test unit 314 may transmit a first test message to the first monitoring unit 311. For example, the first test unit 314 may periodically transmit the first test message to the first monitoring unit 311.

Exemplarily, a transmitting period of the first test message may be preconfigured in the register 330 or may be configured by software. The transmitting period of the first test message may be several milliseconds, several microseconds, or several seconds, for example: 10 milliseconds, 100 milliseconds, 300 milliseconds, 800 milliseconds, 10 microseconds, 200 microseconds, 500 microseconds, or the like, which is not limited in this embodiment of the present application.

The first test message is not in correspondence to the first preset protocol. For example, a number of data in the first test message may be different from the target number in the first preset protocol. A data total length of the first test message may be different from the target data total length in the first preset protocol. In other words, the first test message may be considered as a first message that is simulated or preset by the first test unit 314 and not in correspondence to the first preset protocol.

Because the first test message is periodically transmitted, in a case that the function of the first monitoring unit 311 is normal, the first test message may be monitored periodically by the first monitoring unit 311, and the first error information or the first interrupt signal may be transmitted periodically from the first monitoring unit 311 to the third functional module 130. In other words, if the first error information or the first interrupt signal can be received periodically by the third functional module 130, it indicates that the function of the first monitoring unit 311 is normal, or in other words, the first monitoring unit 311 operates normally. On the contrary, if the first error information or the first interrupt signal cannot be received periodically by the third functional module 130, it indicates that the function of the first monitoring unit 311 is abnormal, or in other words, the first monitoring unit 311 operates abnormally.

In another implementation, the third functional module 130 may output first warning information when the first error information or the first interrupt signal is received, so as to indicate by the first warning information that the function of the first monitoring unit 311 is normal. In this case, if the third functional module 130 can periodically output the first warning information, it indicates that the function of the protocol checking submodule 310 is normal; and if the third functional module 130 does not periodically output the first warning information, it indicates that the function of the protocol checking submodule 310 is abnormal.

In another implementation, the third functional module 130 outputs second warning information when the first error information or the first interrupt signal is not received periodically, so as to indicate by the second warning information that the protocol checking submodule 310 (for example, the first monitoring unit 311) operates abnormally.

Exemplarily, the second warning information may be, for example, an error message, an error log, or a warning message, output to an operating system, which is not specifically limited in this embodiment of the present application.

In the foregoing embodiments, when the first message transmitted from the second functional module 120 to the first functional module 110 is monitored, the first isolation module 300 controls transmission of the first message based on the correspondence between the first message and the first preset protocol. However, in a case that the first functional module 110 transmits a first access request message to the second functional module 120 and the first message is a response message corresponding to the first access request message, the second functional module 120 may fail to transmit the first message normally due to some reasons. For example, the second functional module 120 operates abnormally and fails to transmit the first message normally after receiving the first access request message. For another example, the communication between the first functional module 110 and the second functional module 120 is abnormal, causing the second functional module 120 to fail to receive the first access request message, and thus does not transmit the first message.

Exemplarily, the first access request message includes, but is not limited to, any one or more of a write request message, a read request message, a synchronization request message, a lock request message, and the like. Correspondingly, the first message includes, but is not limited to, any one or more of a write response message, a read response message, a synchronization response message, a lock response message, and the like.

Generally, after transmitting the first access request message to the second functional module 120, the first functional module 110 may wait for the second functional module 120 to return a response message. If no response message is received by the first functional module 110 for a preset maximum waiting duration, it may be considered that the first functional module 110 is in a stuck state. The maximum waiting duration may be preconfigured in the register 330 or may be configured by software. The maximum waiting duration may be, for example, several milliseconds, several microseconds, or several seconds, which is not limited in this embodiment of the present application.

Figure 5:
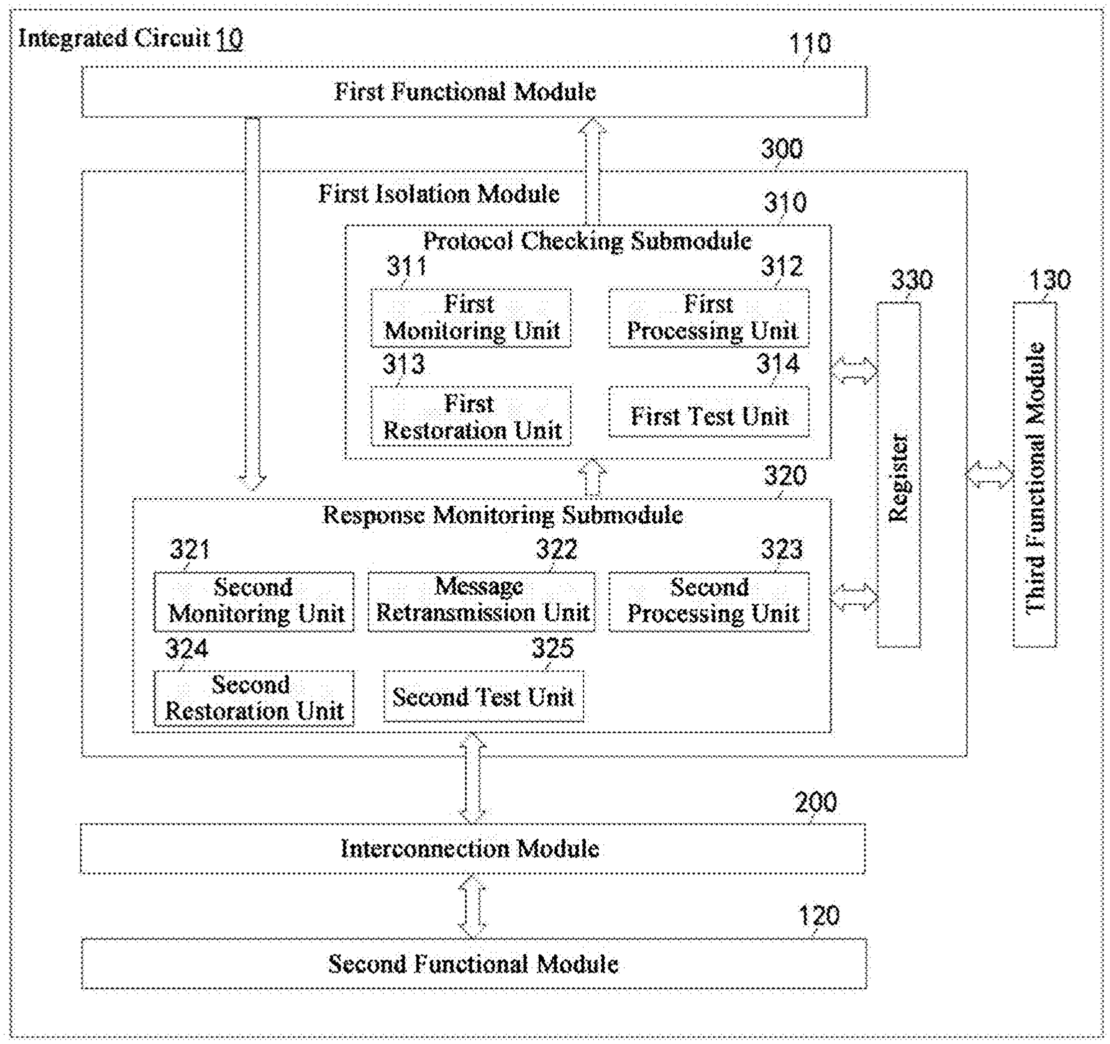
FIG. 5 is a schematic diagram of a third structure of an integrated circuit according to an exemplary embodiment of the present disclosure.

FIG. 5 is a schematic diagram of a third structure of the integrated circuit 10 according to an exemplary embodiment of the present disclosure.

As shown in FIG. 5, in some embodiments, to prevent the first functional module 110 from being stuck due to a long wait for a response message, the first isolation module 300 may further include a response monitoring submodule 320 configured to, for example, monitor a message passing through the first isolation module 300, and retransmit a request message to the module that should transmit the response message when a response timeout is monitored. The response monitoring submodule 320 may include a functional circuit for implementing its function and a communication interface. When the first access request message transmitted from the first functional module 110 to the second functional module 120 passes through the first isolation module 300, the response monitoring submodule 320 may monitor the first access request message, and determine whether the first message transmitted from the second functional module 120 is monitored within a first duration from when the first access request message is monitored. The first message herein is a response message transmitted from the second functional module 120 to the first functional module 110 when the first access request message transmitted from the first functional module 110 is received. If the first message is not monitored, the response monitoring submodule 320 retransmits the first access request message to the second functional module 120; and if the first message is monitored, the response monitoring submodule 320 transmits the first message to the protocol checking submodule 310 for processing.

Further, as shown in FIG. 5, in an embodiment, the response monitoring submodule 320 may include a second monitoring unit 321 and a message retransmission unit 322. In an example, the units, for example, the second monitoring unit 321 and the message retransmission unit 322, in the response monitoring submodule 320 may be two different functional sub-circuits in the response monitoring submodule 320. The second monitoring unit 321 may be communicatively connected to the message retransmission unit 322 through the communication interface in the response monitoring submodule 320. In another example, the units, for example, the second monitoring unit 321 and the message retransmission unit 322, in the response monitoring submodule 320 may alternatively be two different software units in a software program for implementing the function of the response monitoring submodule 320. An implementation of the second monitoring unit 321 and the message retransmission unit 322 is not limited in this embodiment of the present application.

In an implementation, the second monitoring unit 321 may determine, within the first duration from when the first access request message is monitored, whether the first message is monitored. If the first message is not monitored, the second monitoring unit 321 transmits second error information to the message retransmission unit 322. The first duration may be less than a maximum waiting duration. The second error information may include an error type, for example, the error type of timeout.

Exemplarily, the first duration may be preconfigured in the register 330 or may be configured by software. The first duration may be several milliseconds, several microseconds, or several seconds, for example: 50 milliseconds, 100 milliseconds, 300 milliseconds, 1000 milliseconds, 100 microseconds, 500 microseconds, 800 microseconds, or the like, which is not limited in this embodiment of the present application.

In an example, the second error information may include specific content of the error type, for example, response timeout. In this case, a large amount of data are transmitted from the second monitoring unit 321 to the message retransmission unit 322, which is not conducive to improving the efficiency of communication between the second monitoring unit 321 and the message retransmission unit 322.

In another example, to improve the efficiency of communication between the second monitoring unit 321 and the message retransmission unit 322, a corresponding error code may be preset for each error type, and the second error information needs to include only an error code corresponding to the error type, instead of the specific content of the error type, thereby the amount of data transmitted being reduced and the efficiency of communication between the second monitoring unit 321 and the message retransmission unit 322 being improved.

Exemplarily, the second monitoring unit 321 may determine the error code that should be included in the second error information by looking up a table. For example, in a case that a first relationship table is prestored in the register 330, the second monitoring unit 321 may obtain the error code that should be included in the second error information by looking up the first relationship table. For example, if the error type is timeout, and the error code of the error type of timeout in the first relationship table is 4, the second monitoring unit 321 may determine that the error code included in the second error information is 4 by looking up the first relationship table.

In addition, the register 330 may further include a second relationship table. The second relationship table may be a relationship table associated to the second monitoring unit 321. In other words, the second relationship table may be exclusively used by the second monitoring unit 321. The second relationship table may also record a correspondence between error types and error codes. In this way, the second monitoring unit 321 may determine the error code that should be included in the second error information by looking up the second relationship table. Certainly, the second relationship table may alternatively be a relationship table that is not associated to the second monitoring unit 321. In other words, the second relationship table may also be provided for other units and modules for use. An association relationship between the second relationship table and the second monitoring unit 321 is not specifically limited in this embodiment of the present disclosure.

It may be understood that, when the first relationship table is associated to the first monitoring unit 311 and the second relationship table is associated to the second monitoring unit 321, contents in the relationship tables may be flexibly and differentially configured according to functions of monitoring units corresponding to the relationship tables (for example, a monitored content or a content of error information that needs to be reported), without affecting each other.

In an implementation, when the first access request message is monitored, the second monitoring unit 321 may further record a time t1 at which the second functional module 120 transmits the first access request message, and determine, based on a maximum waiting duration of the first functional module 110, a time t2 at which the first functional module 110 ends waiting (that is, a time at which the first functional module 110 enters a stuck state). In this way, the second monitoring unit 321 may configure the time t1 and the time t2 in the second error information, and transmit the second error information to the message retransmission unit 322 for use by the message retransmission unit 322 in performing its function.

Next, the message retransmission unit 322 may retransmit the first access request message to the second functional module 120 when the second error information is received. In this way, if the retransmitted first access request message is received by the second functional module 120, the second functional module 120 may transmit the first message in response to the first access request message, thereby improving the probability that the first message is received by the first message is received by the first functional module 110 and reducing the probability that the first functional module 110 is stuck.

In an implementation, when the first access request message is monitored by the second monitoring unit 321, the message retransmission unit 322 may cache the first access request message in the register 330 for backup. In this way, in a case that the first access request message is cached in the register 330, if the second error information is received by the message retransmission unit 322, the message retransmission unit 322 may read the cached first access request message from the register 330, and then retransmit the first access request message to the second functional module 120.

In an implementation, to further improve the probability that the first message is received by the first functional module 110, the message retransmission unit 322 may retransmit the first access request message to the second functional module 120 a plurality of times within a maximum waiting duration from when the first functional module 110 transmits the first access request message.

Exemplarily, it is assumed that the maximum waiting duration is 600 milliseconds, and the first duration is 100 milliseconds. If the first access request message transmitted at the time t1 is monitored, the second monitoring unit 321 may wait for receiving of the first message, and transmit the second error information to the message retransmission unit 322 when the first message is not monitored for the first duration (100 milliseconds) of waiting. When the second error information is received, the message retransmission unit 322 may retransmit the first access request message to the second functional module 120, and wait for receiving of the first message When the first message is not yet monitored for a second duration of waiting, the message retransmission unit 322 may retransmit the first access request message to the second functional module 120 and continue to wait for receiving of the first message, and so on, until the first message is monitored by the second monitoring unit 321, or until the time t2 (that is, the time t1 plus 600 milliseconds). The second duration may be the same as or different from the first duration, for example, the second duration is also 100 milliseconds.

In this way, before the first functional module 110 ends waiting, the message retransmission unit 322 may periodically transmit the first access request message to the second functional module 120 a plurality of times, thereby improving the probability that the first message is received by the first functional module 110 and reducing the probability that the first functional module 110 is stuck.

It may be understood that, in a case that the second functional module 120 operates abnormally, such as being stuck, the second functional module 120 may not return the first message even if the message retransmission unit 322 transmits the first access request message to the second functional module 120 a plurality of times. In this case, continuing to transmit the first access request message is an invalid operation. To avoid such an invalid operation, in an implementation, a maximum retransmission number may be further set for the message retransmission unit 322. For example, the maximum retransmission number is 3. In this case, after the message retransmission unit 322 retransmits the first access request message to the first functional module 110 three times, the message retransmission unit 322 may not continue to retransmit the first access request message to the first functional module 110 even if the first message is not monitored or the time t2 is reached.

The second duration and the maximum retransmission number may be preconfigured in the register 330 or may be configured by software, which is not limited in this embodiment of the present application.

It may be understood that, in a case that the message retransmission unit 322 retransmits the first access request message to the second functional module 120 one or more times, if the first message is not yet received by the first functional module 110, the first functional module 110 may enter a stuck state at the time t2 when the waiting ends.

In an implementation, to prevent the first functional module 110 from being stuck, if the first message is not monitored by a second processing unit 323 for the second duration when the first access request message is retransmitted, the second processing unit 323 may transmit a preset response message corresponding to the first access request message to the first functional module 110.

If the second processing unit 323 transmits the first access request message to the first functional module 110 a plurality of times, the second processing unit 323 may transmit the preset response message to the first functional module 110 when the first message is not monitored by the second processing unit 323 for the second duration from the last transmitting of the first access request message.

In an example, the preset response message may be a default response message, which may be preconfigured in the register 330. In this way, the second processing unit 323 may read the default response message from the register 330 and transmit the default response message to the first functional module 110.

The default response message may be a message that is in correspondence to the first preset protocol. In this way, the first functional module 110 is not stuck after receiving the default response message. For example, a number of data in the default response message may be the same as the target number in the first preset protocol.

It may be understood that, because the second processing unit 323 is not aware of the correct content of the data in the first message, the data in the default response message may not be the response data expected by the first functional module 110 in terms of content. However, because the target number of data in the message, instead of the specific content of the message, is defined in the first preset protocol, it is considered, based on the first preset protocol, that the response message that complies with the first preset protocol is received by the first functional module 110 from the second functional module 120 as long as the target number of data is received by the first functional module 110. Therefore, the first functional module 110 may release a suspended state of waiting for receiving of a response message and thus is not stuck, thereby security isolation of different functional modules being achieved well.

In another example, the preset response message may be a preset error response message, which is used for reporting a state of response error to the first functional module 110. In this way, when receiving the error response message, the first functional module 110 may determine that the second functional module 120 is in response error, and thus release the suspended state of waiting for receiving of the response message and is not stuck, thereby security isolation of different functional modules being achieved well.

In an implementation, if the first message is not monitored by the second processing unit 323 for the second duration from retransmitting of the first access request message, the second processing unit 323 may transmit second error information to the third functional module 130.

In an example, the second error information may include specific content of the error type, for example, include response timeout. In this case, a large amount of data are transmitted from the second processing unit 323 to the third functional module 130, which is not conducive to improving the efficiency of communication between the second processing unit 323 and the third functional module 130.

In another example, to improve the efficiency of communication between the second processing unit 323 and the third functional module 130, a corresponding error code may be preset for each error type. The second error information needs to include only an error code corresponding to the error type instead of the specific content of the error type, thereby the amount of data transmitted being reduced and the efficiency of communication between the second processing unit 323 and the third functional module 130 being improved.

The second processing unit 323 may determine the error code that should be included in the second error information by looking up a table. For example, the second processing unit 323 may obtain the error code that should be included in the second error information by looking up the first relationship table or the second relationship table. For example, if the error type is timeout, and the error code of the error type of timeout in the second relationship table is 4, the second processing unit 323 may determine that the error code included in the second error information is 4 by looking up the second relationship table.

In another implementation, if the first message is not monitored by the second monitoring unit 321 for a first duration from when the first access request message is monitored, the second monitoring unit 321 may write second error information into the register 330. Subsequently, the second processing unit 323 may transmit a second interrupt signal to the third functional module 130 if the first message is not monitored by the second processing unit 323 for the second duration from retransmitting of the first access request message. The second interrupt signal may be a hardware signal or a software signal.

In an example in which the second interrupt signal is a hardware signal, the third functional module 130 may include a second hardware interface for receiving of an external hardware interrupt signal. The second hardware interface and the first hardware interface may be the same interface or may be different interfaces. The second processing unit 323 may be communicatively connected to the second hardware interface of the third functional module 130. In an example, the second interrupt signal may be a high level signal. In this case, when the second interrupt signal is not transmitted, the second processing unit 323 inputs a low level to the second hardware interface of the third functional module 130; and when the second interrupt signal is transmitted, the second processing unit 323 inputs a high level to the second hardware interface of the third functional module 130. In another example, the second interrupt signal may be a low level signal. In this case, when the second interrupt signal is not transmitted, the second processing unit 323 inputs a high level to the second hardware interface of the third functional module 130; and when the second interrupt signal is transmitted, the second processing unit 323 inputs a low level to the second hardware interface of the third functional module 130.

An implementation of the second interrupt signal is not specifically limited in this embodiment of the present application.

Next, when the second interrupt signal is received, the third functional module 130 acquires the second error information from the register 330 in response to the second interrupt signal.

It may be understood that, in a case that a history message transmitted between the first functional module 110 and the second functional module 120 is not in correspondence to the first preset protocol, the register 330 may also include error information corresponding to the history message. In other words, when the second interrupt signal is received, the third functional module 130 may acquire from the register 330 not only the second error information but also other error information corresponding to the history message.

What specific information the third functional module 130 may acquire may depend on a policy for acquiring information by the third functional module 130 and the configuration in the register 330, which is not limited in this embodiment of the present application.

In an example, when the second interrupt signal is received, the third functional module 130 may acquire all error information from the register 330.

In an example, the register 330 may store error information in a manner of a FIFO queue. When the second interrupt signal is received, the third functional module 130 may acquire the latest error information, that is, the second error information, from a tail of the FIFO queue.

It may be learned that, in an implementation, the second processing unit 323 may transmit the second error information directly to the third functional module 130, so that the second error information is received directly by the second processing unit 323. In another implementation, instead of transmitting the second error information directly to the third functional module 130, the second processing unit 323 may alternatively transmit the second interrupt signal to the third functional module 130, and the third functional module 130 acquires the second error information from the register 330. In this way, an amount of data transmitted between the second processing unit 323 and the third functional module 130 is reduced, thereby the efficiency of communication between the second processing unit 323 and the third functional module 130 being improved.

Next, when the second error information is acquired, the third functional module 130 may determine a corresponding handling policy based on an error type of the second error information, and execute the corresponding handling policy, such as restarting or resetting the second functional module 120, to cause the second functional module 120 to be restored from an abnormal state to a normal state, so as to prevent the error from occurring again or to reduce an occurrence frequency of the error. In some implementations, the handling policy of the third functional module 130 may alternatively be set by a user, which is not limited in this embodiment of the present disclosure.

In an embodiment, the response monitoring submodule 320 may further include a second restoration unit 324. Upon a timeout response to the first message being completed by the response monitoring submodule 320, the second restoration unit 324 may restore the second monitoring unit 321, the message retransmission unit 322, and the second processing unit 323 to an enabled state, so that the response monitoring submodule 320 starts a new round of monitoring and processing functions.

A timeout response to the first message being completed by the response monitoring submodule 320 may include:

the first message being monitored by the second monitoring unit 321, upon retransmitting of the first access request message by the message retransmission unit 322; transmitting of a preset response message corresponding to the first access request message to the first functional module 110 being completed by the second processing unit 323, when the first message is not monitored by the second monitoring unit 321; alternatively, transmitting of second error information to the third functional module 130 being completed by the second processing unit 323, when the first message is not monitored by the second monitoring unit 321; and alternatively, transmitting of a second interrupt signal to the third functional module 130 being completed by the second processing unit 323, when the first message is not monitored by the second monitoring unit 321.

In other words, in a case that the first message timeouts, if all the units of the response monitoring submodule 320 complete their respective functions, it may be determined that the timeout response to the first message by the response monitoring submodule 320 is completed.

It should be noted herein that, during the period in which the units of the response monitoring submodule 320 perform their respective functions in a case that the first message times out, the response monitoring submodule 320 does not respond to timeout of another message. In other words, during this period, the units of the response monitoring submodule 320 are in a disabled state, or in a busy state.

Upon the timeout response to the first message by the response monitoring submodule 320 being completed, the second restoration unit 324 may restore or reset the units in the response monitoring submodule 320, for example, the second monitoring unit 321, the message retransmission unit 322, and the second processing unit 323, to an enabled state or an idle state, in order to enable the response monitoring submodule 320 to respond to timeout of other subsequent messages. In this way, subsequently, if timeout of a message is monitored, the response monitoring submodule 320 may continue to perform a corresponding function, so as to implement a timeout response to the message.

In this embodiment of the present application, after it is monitored by the second monitoring unit 321 that the first message times out and the message retransmission unit 322 retransmits the first access request message to the second functional module 120, if the first message is not yet monitored by the second monitoring unit 321, the second processing unit 323 may transmit second error information or a second interrupt signal to the third functional module 130. In this case, if the second error information or the second interrupt signal is never received by the third functional module 130, it usually means that the first message does not time out, or that the function of the response monitoring submodule 320 is abnormal. The function of the response monitoring submodule 320 being abnormal may include, for example, that the second monitoring unit 321 cannot monitor the timeout of first message, or that the second processing unit 323 cannot normally transmit the second error information or the second interrupt signal. However, the third functional module 130 is not aware of a specific reason why the second error information or the second interrupt signal is never received. In other words, the third functional module 130 is not aware of whether the function of the response monitoring submodule 320 is normal.

In an embodiment, to enable the third functional module 130 to be aware of whether the function of the response monitoring submodule 320 is normal, the response monitoring submodule 320 further includes a second test unit 325.

The second test unit 325 may transmit a second test message to the second monitoring unit 321. For example, the second test unit 325 may periodically transmit the second test message to the second monitoring unit 321.

Exemplarily, a transmitting period of the second test message may be preconfigured in the register 330 or may be configured by software. The transmitting period of the second test message may be several milliseconds, several microseconds, or several seconds, for example: 10 milliseconds, 100 milliseconds, 300 milliseconds, 800 milliseconds, 10 microseconds, 200 microseconds, 500 microseconds, or the like, which is not limited in this embodiment of the present application.

In this embodiment of the present application, the second monitoring unit 321 may be configured to monitor a response message corresponding to the second test message within a first duration from when the second test message is received. This function may be configured through hardware (for example, in the register 330) or software. However, in order to test the function of the response monitoring submodule 320, the second test unit 325 does not transmit the response message corresponding to the second test message to the second monitoring unit 321. In other words, the second test unit 325 creates a timeout scenario to test whether the function of the response monitoring submodule 320 is normal.

Because the second test message is periodically transmitted, in a case that the function of the second monitoring unit 321 is normal, the second test message may be monitored periodically by the second monitoring unit 321, and the second monitoring unit 321 may periodically monitor whether the response message corresponding to the second test message is received.

It may be understood that, because the second test unit 325 does not transmit the response message corresponding to the second test message to the second monitoring unit 321, the response message corresponding to the second test message is not monitored by the second monitoring unit 321 within each period. Therefore, if the function of the second monitoring unit 321 is normal, the second monitoring unit 321 may periodically transmit error information including an error type of timeout to the second processing unit 323, for example, second error information.

If the function of the second processing unit 323 is normal, the second processing unit 323 may transmit the second error information or the second interrupt signal to the third functional module 130 when the error information is received. In other words, if the response message corresponding to the second test message is not monitored periodically by the second monitoring unit 321, the second processing unit 323 may periodically transmit the second error information or the second interrupt signal to the third functional module 130.

In other words, if the second error information or the second interrupt signal can be received periodically by the third functional module 130, it indicates that the functions of the second monitoring unit 321 and the second processing unit 323 are normal. On the contrary, if the second error information or the second interrupt signal cannot be received periodically by the third functional module 130, it indicates that the function of the second monitoring unit 321 and/or the second processing unit 323 is abnormal.

In an implementation, the third functional module 130 may output third warning information when the second error information or the second interrupt signal is received, so as to indicate by the third warning information that a message that does not comply with the first preset protocol has been monitored by the second monitoring unit 321. In this way, if the third functional module 130 can periodically output the third warning information, it indicates that the function of the response monitoring submodule 320 is normal; and if the third functional module 130 cannot periodically output the third warning information, it indicates that the function of the response monitoring submodule 320 is abnormal.

In another implementation, the third functional module 130 may output fourth warning information when the second error information or the second interrupt signal is not received periodically, so as to indicate by the fourth warning information that the function of the response monitoring submodule 320 is abnormal.

Exemplarily, the fourth warning information may be, for example, an error message, an error log, or a warning message, output to an operating system, which is not specifically limited in this embodiment of the present application. This is not specifically limited in this embodiment of the present application.

In the foregoing embodiments, a manner in which an isolation module performs security protection on a functional module is described in detail by using an example in which the first isolation module 300 performs security protection on the first functional module 110. It may be understood that, in some embodiments, more isolation modules may alternatively be provided to protect other functional modules in the integrated circuit 10 based on actual requirements, security levels of the functional modules, and other factors. For example, an isolation module may be provided between the second functional module 120 and the interconnection module 200, so as to perform security protection on the second functional module 120. For a specific implementation, refer to the foregoing embodiments, which is not specifically limited herein.

In addition, the interconnection module 200 sometimes also needs to have a relatively high security level due to responsibility for communication between the modules in the integrated circuit 10, and thus also needs to be protected to ensure that the interconnection module 200 is not affected by illegal access or a timeout response.

Figure 6:
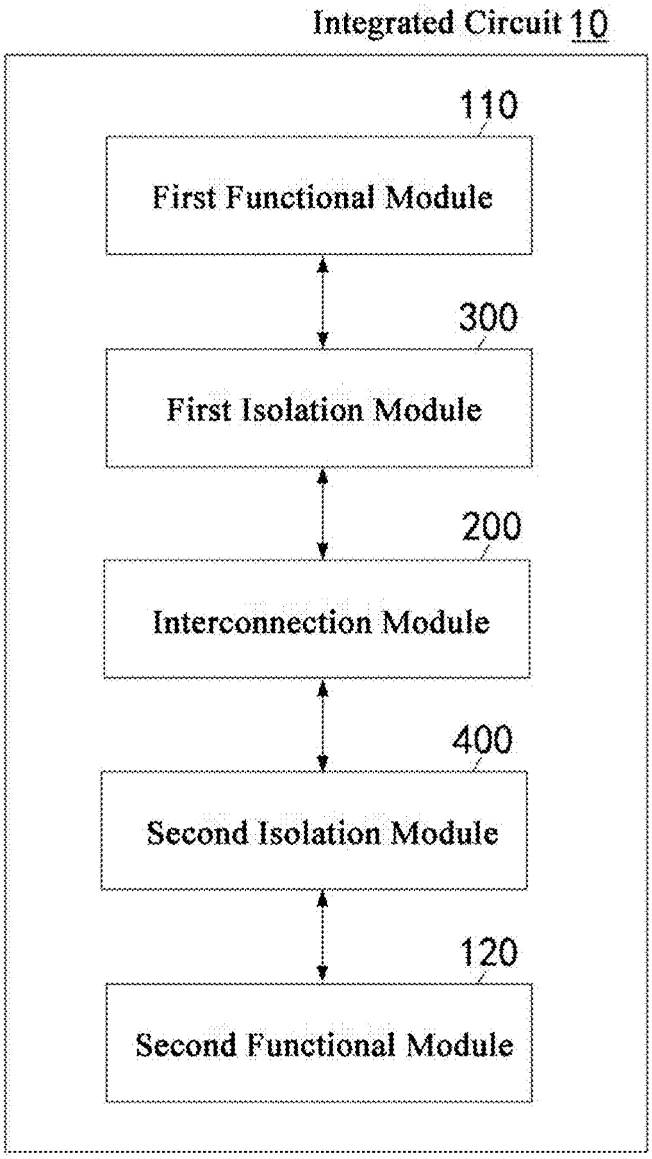
FIG. 6 is a schematic diagram of a fourth structure of an integrated circuit according to an exemplary embodiment of the present disclosure.

FIG. 6 is a schematic diagram of a fourth structure of the integrated circuit 10 according to an exemplary embodiment of the present disclosure.

As shown in FIG. 6, in an embodiment, the integrated circuit 10 may further include a second isolation module 400.

The second isolation module 400 may be disposed on a communication link between the interconnection module 200 and the second functional module 120. In this way, before the first message transmitted from the second functional module 120 to the first functional module 110 arrives at the interconnection module 200, the second isolation module 400 may control transmission of the first message based on a correspondence between the first message and a second preset protocol.

The second preset protocol may be the same as or different from the first preset protocol. This may be specifically determined by a bus protocol standard used between the interconnection module 200 and the second functional module 120, and is not limited in this embodiment of the present application.

Specifically, in a case that the first message is not in correspondence to the second preset protocol, the second isolation module 400 may block the first message. In this way, neither the interconnection module 200 nor the first functional module 110 receives the first message, the interconnection module 200 and the first functional module 110 being prevented from being stuck, thereby security isolation of different functional modules being achieved well.

In addition, in a case that the first message is in correspondence to the second preset protocol, the second isolation module 400 may continue transmission of the first message, for example, transparent transmission of the first message or transmission of the first message upon performing of a preset processing on the first message, to the first isolation module 300. In this way, the first message may be transmitted to the first isolation module 300 through the interconnection module 200. The first isolation module 300 may further control the transmission of the first message based on the correspondence between the first message and the second preset protocol.

For specific implementation of the second isolation module 400, refer to that of the first isolation module 300, description of which is not repeated herein.

It may be learned that, in the integrated circuit 10 provided in this embodiment of the present disclosure, the first isolation module 300 is provided between the first functional module 110 and the interconnection module 200, and the second isolation module 400 is provided between the second functional module 120 and the second isolation module 400. When the second functional module 120 transmits the first message to the first functional module 110, before the first message arrives at the interconnection module 200, the second isolation module 400 may control the transmission of the first message based on the correspondence between the first message and the second preset protocol, so as to ensure that the interconnection module 200 is not affected by illegal access or a timeout response, thereby protecting the interconnection module 200. Before the first message arrives at the first functional module 110, the first isolation module 300 may further control the transmission of the first message based on the correspondence between the first message and the second preset protocol, so as to ensure that the first functional module 110 is not affected by illegal access or a timeout response, thereby protecting the first functional module 110.

In other words, in the integrated circuit 10 provided in this embodiment of the present disclosure, dual control of the first message may be achieved by providing the first isolation module 300 and the second isolation module 400. In this way, not only the interconnection module 200 may be protected, but also dual protection of the first functional module 110 may be achieved, thereby improving reliability of the integrated circuit 10.

In an embodiment, the first isolation module 300 may also be configured to provide protection for the interconnection module 200, and the second isolation module 400 may also be configured to provide protection for the second functional module 120.

For example, before a second message transmitted from the first functional module 110 to the second functional module 120 arrives at the interconnection module 200, the first isolation module 300 may control transmission of the second message based on a correspondence between the second message and a second preset protocol. The second message may be an access request message transmitted from the first functional module 110 to the second functional module 120, or may be a response message, which is not limited in this embodiment of the present application.

Exemplarily, when the second message is an access request message, the second message includes, but is not limited to, any one or more of a write request message, a read request message, a synchronization request message, a lock request message, and the like. When the second message is a response message, the first message includes, but is not limited to, any one or more of a write response message, a read response message, a synchronization response message, a lock response message, and the like.

Specifically, in a case that the second message is not in correspondence to the second preset protocol, the first isolation module 300 may block the second message. In this way, neither the interconnection module 200 nor the second functional module 120 receives the second message, the interconnection module 200 and the second functional module 120 being prevented from being stuck, thereby security isolation of different functional modules being achieved well.

In addition, in a case that the second message is in correspondence to the second preset protocol, the first isolation module 300 may transparently transmit the second message. In this way, the second message is transmitted to the second isolation module 400 through the interconnection module 200. The second isolation module 400 may further control the transmission of the second message based on the correspondence between the second message and the second preset protocol.

It may be learned that, in the integrated circuit 10 provided in this embodiment of the present disclosure, when the first functional module 110 transmits the second message to the second functional module 120, before the second message arrives at the interconnection module 200, the first isolation module 300 may control the transmission of the second message based on the correspondence between the second message and the second preset protocol, so as to ensure that the interconnection module 200 is not affected by illegal access or a timeout response, thereby protecting the interconnection module 200. Before the second message arrives at the second functional module 120, the second isolation module 400 may further control the transmission of the second message based on the correspondence between the second message and the second preset protocol, so as to ensure that the second functional module 120 is not affected by illegal access or a timeout response, thereby protecting the second functional module 120.

In other words, in the integrated circuit 10 provided in this embodiment of the present disclosure, dual control of the second message may be achieved by providing the first isolation module 300 and the second isolation module 400. In this way, not only the interconnection module 200 may be protected, but also dual protection of the second functional module 120 may be achieved, thereby improving reliability of the integrated circuit 10.

In addition, the first isolation module 300 and the second isolation module 400 implement control of bidirectional transmission of messages between the first functional module 110 and the second functional module 120, thereby improving flexibility of message transmission control.

Figure 7:
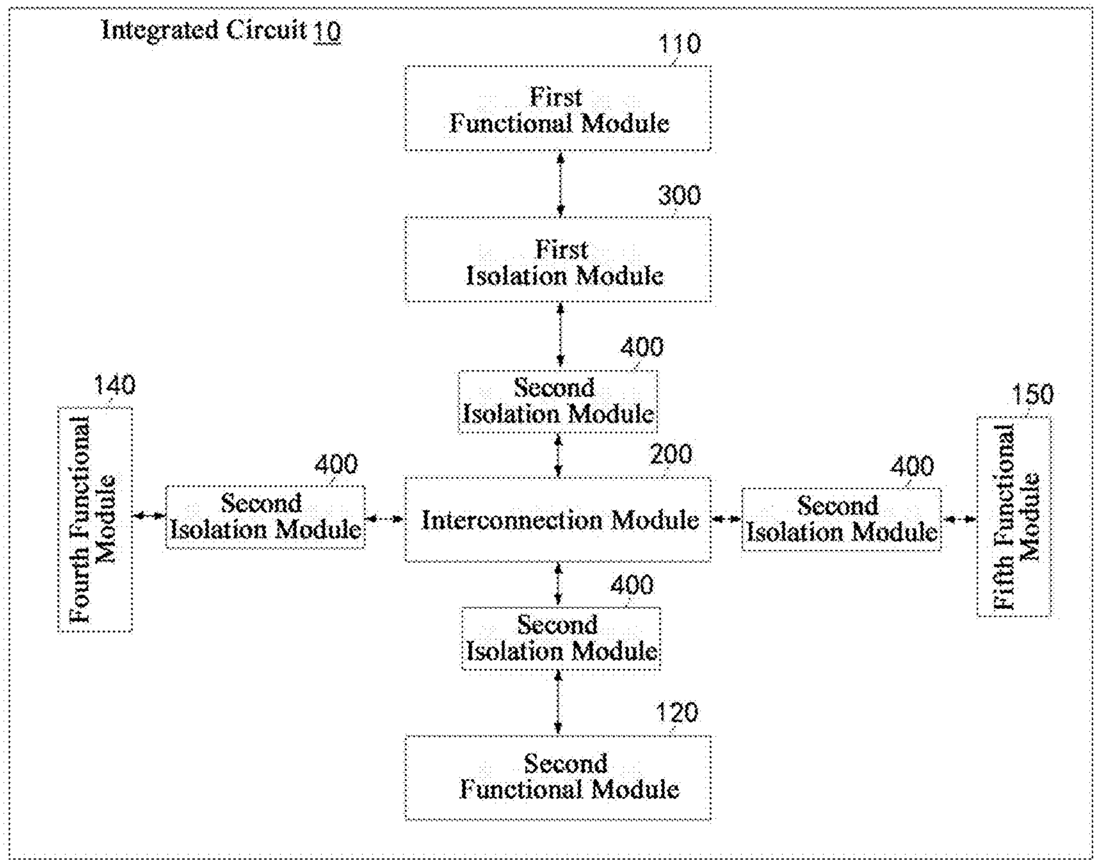
FIG. 7 is a schematic diagram of a fifth structure of an integrated circuit according to an exemplary embodiment of the present disclosure.

FIG. 7 is a schematic diagram of a fifth structure of the integrated circuit 10 according to an exemplary embodiment of the present disclosure.

As shown in FIG. 7, in an embodiment, not only on a communication link between the interconnection module 200 and the second functional module 120 but also on a communication link between the interconnection module 200 and the first isolation module 300, second isolation modules 400 may be provided.

In this way, when the second functional module 120 transmits the first message to the first functional module 110, before the first message arrives at the interconnection module 200, the second isolation module 400 may control the transmission of the first message based on the correspondence between the first message and the second preset protocol. When the first functional module 110 transmits the second message to the second functional module 120, before the second message arrives at the interconnection module 200, the second isolation module 400 may control the transmission of the second message based on the correspondence between the second message and the second preset protocol. In this way, control of bidirectional transmission of messages passing through the interconnection module 200 in both directions may be performed by using the second isolation module 400.

Further, as shown in FIG. 7, in an implementation, the second isolation module 400 may be provided on a communication link between the interconnection module 200 and a plurality of other modules. For example, in addition to the first functional module 110 and the second functional module 120, the integrated circuit 10 may further include at least one other module, for example, a fourth functional module 140 or a fifth functional module 150. The second isolation module 400 may be provided on a communication link between the first functional module 110 and the interconnection module 200, and/or may be provided on a communication link between the second functional module 120 and the interconnection module 200, and/or may be provided on a communication link between the fourth functional module 140 and the interconnection module 200, and/or may be provided on a communication link between the fifth functional module 150 and the interconnection module 200. In this way, the second isolation module 400 may isolate the interconnection module 200 from a plurality of other modules in the circuit. In other words, a message from another module, for example, a message from the fourth functional module 140 or a message from the fifth functional module 150, may pass through the second isolation module 400 first before being transmitted to the interconnection module 200. The second isolation module 400 may control transmission of the message based on a correspondence between the message and the second preset protocol to determine whether to transmit the message to the interconnection module 200.

It should be noted herein that, in this embodiment of the present disclosure, the second isolation module 400 is provided on communication links between the interconnection module 200 and a plurality of other modules, and isolation between the interconnection module 200 and other modules in the circuit is achieved. Therefore, a plurality of patterns of the second isolation module 400 illustrated in various orientations of the interconnection module 200 in FIG. 7 are used only for expressing the circuit isolation between the interconnection module 200 and other different modules by the second isolation module 400, and do not represent an actual number, distribution, and the like of the second isolation module 400, that is, do not constitute any limitation on a physical structure of the second isolation module 400. For example, a plurality of second isolation modules 400 may be physically implemented as one module, or may be separately implemented as a plurality of physical modules. The actual number and distribution of the second isolation module 400 may be appropriately designed according to the line layout of the communication link on the integrated circuit 10 and other factors, which is not limited in this embodiment of the present disclosure.

Exemplary Method

A procedure of the method in this embodiment may be applied to the integrated circuit 10, and specifically, may be implemented by an isolation module in the integrated circuit 10. The isolation module, may be, for example, the first isolation module 300, the second isolation module 400, and/or other isolation modules in the foregoing embodiment.

Figure 8:
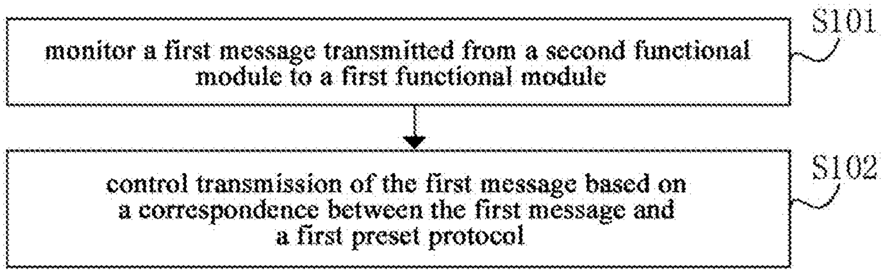
FIG. 8 is a first schematic flowchart of a communication method for an integrated circuit according to an exemplary embodiment of the present disclosure.

FIG. 8 is a first schematic flowchart of a communication method for an integrated circuit according to an exemplary embodiment of the present disclosure.

As shown in FIG. 8, the method includes the following steps:

S101: monitoring a first message transmitted from a second functional module to a first functional module.

S102: Control transmission of the first message based on a correspondence between the first message and a first preset protocol when the first message is monitored.

Specifically, before the first message is transmitted to the first functional module, the transmission of the first message may be controlled based on the correspondence between the first message and the first preset protocol.

Figure 9:
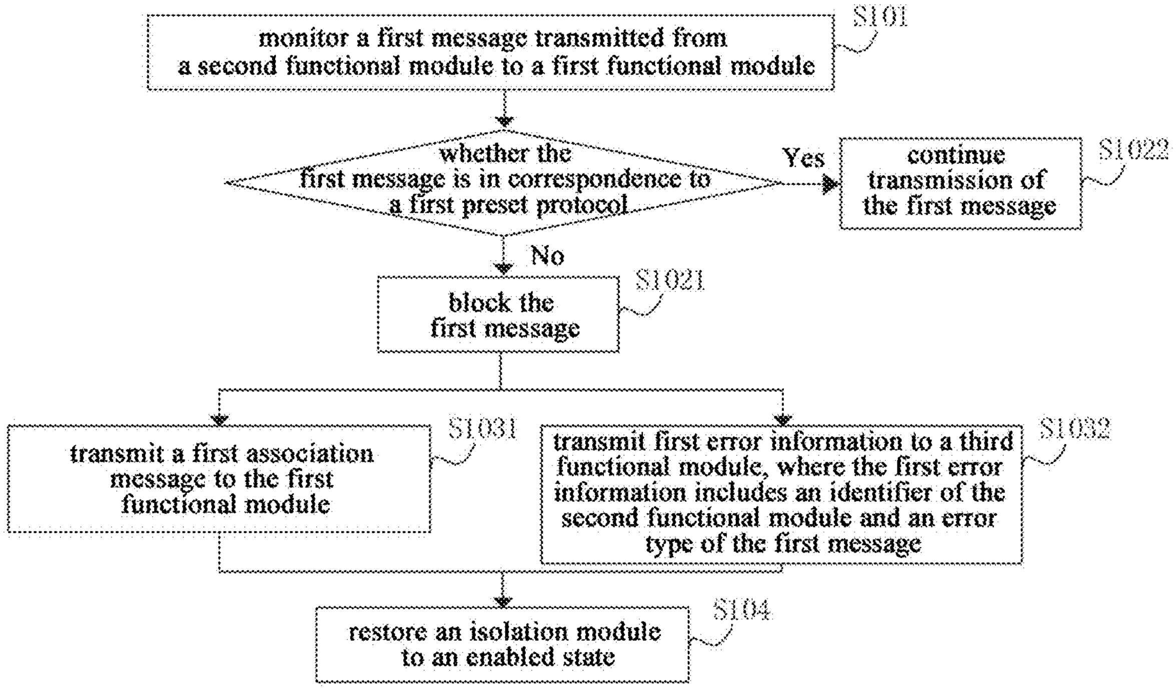
FIG. 9 is a second schematic flowchart of a communication method for an integrated circuit according to an exemplary embodiment of the present disclosure.

FIG. 9 is a second schematic flowchart of a communication method for an integrated circuit according to an exemplary embodiment of the present disclosure.

As shown in FIG. 9, in an implementation, step S102 of controlling transmission of the first message based on a correspondence between the first message and a first preset protocol when the first message is monitored may specifically include the following steps:

Step S1021: Block the first message in a case that the first message is not in correspondence to the first preset protocol.

Step S1022: Continue transmission of the first message in a case that the first message is in correspondence to the first preset protocol.

The continuing transmission of the first message may include, for example: transparently transmitting the first message or transmitting the first message to the first functional module by performing preset processing on the first message.

In an implementation, the first message being not in correspondence to the first preset protocol includes: a number of data in the first message is different from a target number preset in the first preset protocol. After step S1021, the method may further include the following step:

Step S1031: Determine a first association message based on the first preset protocol in a case that the first message is not in correspondence to the first preset protocol, and transmit the first association message to the first functional module, where a number of data in the first association message is equal to the target number.

In a case that the first message is not in correspondence to the first preset protocol, for example, in a case that the number of data in the first message is less than the target number, the number of data in the first message may be replenished to the target number to obtain the first association message. In addition, in a case that the number of data in the first message is greater than the target number, the target number of data may be cut out from the first message to obtain the first association message.

In an implementation, after step S1021, the method may further include the following step:

Step S1032: Transmit first error information to a third functional module, where the first error information includes an identifier of the second functional module and an error type of the first message.

In another implementation, after step S1021, the first error information may alternatively be written into a register, and then a first interrupt signal is transmitted to a third functional module, where the first error information includes an identifier of the second functional module and an error type of the first message, so that the third functional module acquires the first error information from the register when the first interrupt signal is received.

In an implementation, after step S1031 and/or step S1032, the method may further include the following step:

Step S104: Restore the isolation module to an enabled state.

In this way, the isolation module may start a new round of monitoring and processing functions. In this embodiment, for specific operations of the steps, refer to the foregoing apparatus embodiment, description of which is not repeated herein.

It may be learned from the foregoing technical solution that, in the method provided in this embodiment, in a case that the second functional module transmits a first message to the first functional module, for example, before the first message is transmitted to the first functional module, transmission of the first message may be controlled based on a correspondence between the first message and a first preset protocol. In this way, the first functional module is prevented from receiving a first message not in correspondence to the first preset protocol and thus is not stuck, thereby security isolation of different functional modules being achieved well and reliability of the integrated circuit being improved.

Figure 10:
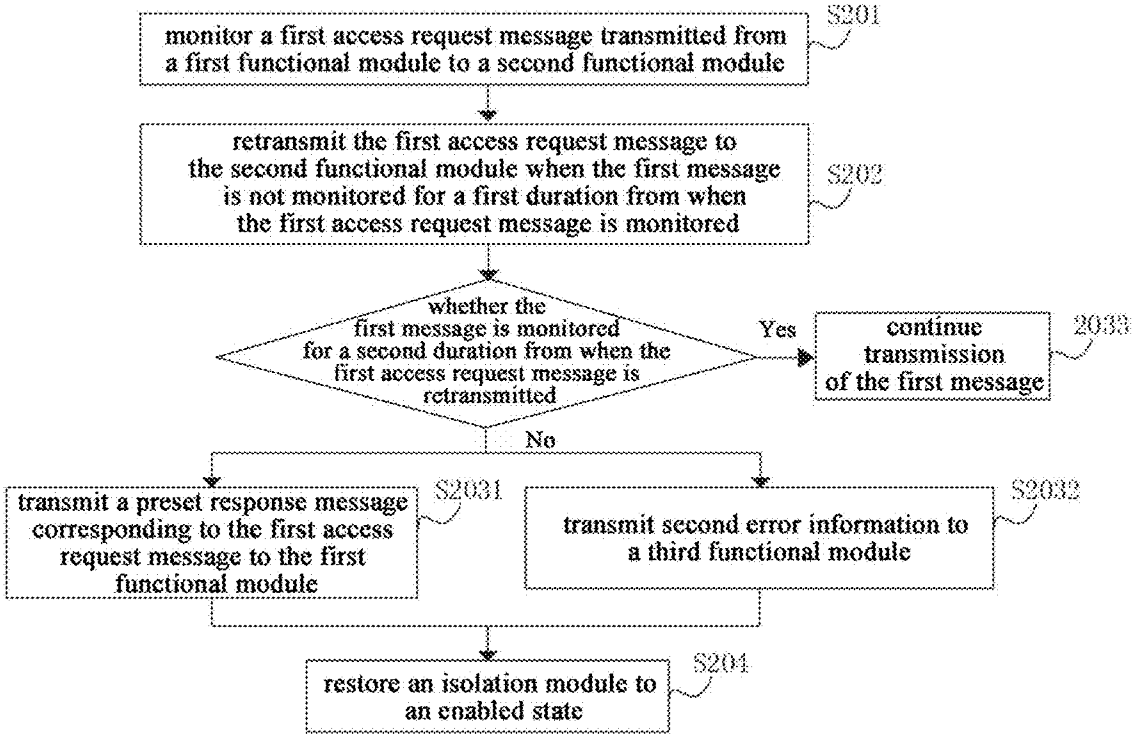
FIG. 10 is a third schematic flowchart of a communication method for an integrated circuit according to an exemplary embodiment of the present disclosure.

FIG. 10 is a third schematic flowchart of a communication method for an integrated circuit according to an exemplary embodiment of the present disclosure.

As shown in FIG. 10, the method includes the following steps:

Step S201: Monitoring a first access request message transmitted from the first functional module to the second functional module.

Step S202: Retransmit the first access request message to the second functional module when the first message is not monitored for a first duration from when the first access request message is monitored.

The first message includes a response message transmitted from the second functional module to the first functional module in a case that the first access request message transmitted from the first functional module is received by the second functional module.

In an implementation, the monitored first access request message may be cached in the register, and the first access request message cached in the register is retransmitted to the second functional module in a case that second error information is received.

In an implementation, after step S202, the method may further include the following step:

Step S2031: Transmit a preset response message corresponding to the first access request message to the first functional module in a case that the first message is not monitored for a second duration from when the first access request message is retransmitted.

In an implementation, after step S202, the method may further include the following steps:

Step S2032: Transmit second error information to the third functional module in a case that the first message is not monitored for a second duration from when the first access request message is retransmitted.

In another implementation, after step S202, second error information may alternatively be cached in the register, and a second interrupt signal is transmitted to the third functional module in a case that the first message is not monitored for a second duration from when the first access request message is retransmitted, so that the third functional module acquires the second error information from the register when the second interrupt signal is received.

Step S2033: Continue transmission of the first message in a case that the first message is monitored within the second duration from when the first access request message is retransmitted.

In an implementation, after step S2031 and/or step S2032, the method may further include the following step:

Step S204: Restore the isolation module to an enabled state.

In this way, the isolation module starts a new round of monitoring and processing functions.

In this embodiment, for specific operations of the steps, refer to the foregoing apparatus embodiment, description of which is repeated herein.

It may be learned from the foregoing technical solution that, in the method provided in this embodiment, when the first message is not monitored for the first duration from when the first functional module transmits the first access request message to the second functional module, the first access request message may be retransmitted to the second functional module. In this way, the first functional module is prevented from being stuck due to a long-term suspended state resulting from not receiving the response message from the second functional module, thereby security isolation of different functional modules being achieved well and reliability of the integrated circuit being improved.

Exemplary Integrated Circuit System

Figure 11:
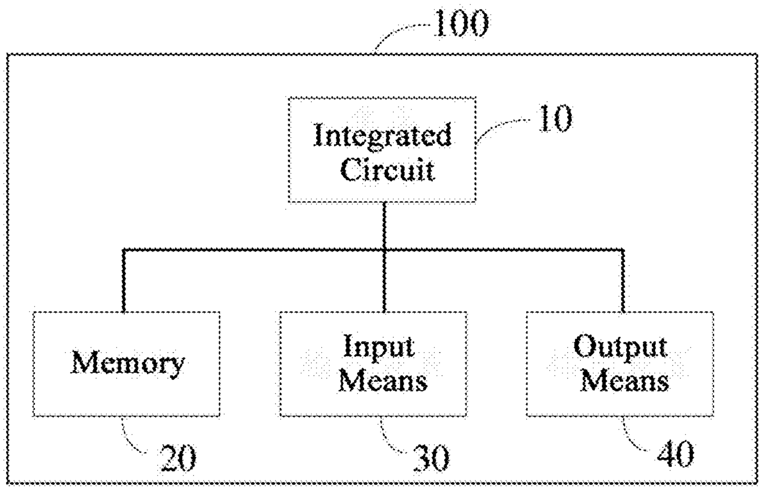
FIG. 11 is a diagram of a structure of an integrated circuit system according to an exemplary embodiment of the present disclosure.

FIG. 11 is a diagram of a structure of an integrated circuit system 100 according to an embodiment of the present disclosure. The system includes at least one integrated circuit 10 and a memory 20.

The integrated circuit 10 may be a central processing unit (CPU) or another form of processing unit having a data processing capability and/or an instruction execution capability, and may control another component in the integrated circuit system 100 to perform a desired function.

The memory 20 may include various forms of computer-readable storage mediums, such as a volatile memory and/or a non-volatile memory. The volatile memory may include, for example, a random access memory (RAM), a cache and/or the like. The non-volatile memory may include, for example, a read-only memory (ROM), a hard disk, a flash memory or the like. The computer-readable storage medium may store one or more computer program instructions. The integrated circuit 10 may run the one or more computer program instructions to implement the communication method for an integrated circuit and/or other desired functions in the foregoing embodiments of the present disclosure.

In an example, the integrated circuit system 100 may further include: an input means 30 and an output means 40. The components are interconnected through a bus system and/or other forms of connection mechanisms (not shown).

The input means 30 may further include, for example, a touchscreen, a key, or a speech input means.

The output means 40 may output various information to the outside, and may include, for example, a display, a speaker, and a communication network and a remote output means connected thereto, and so on.

Certainly, for simplicity, only some of components in the integrated circuit system 100 that are related to the present disclosure are shown in FIG. 11, and components such as a bus and an input/output interface are omitted. Besides, the integrated circuit system 100 may further include any other appropriate components depending on specific applications.

Exemplary Computer Program Product and Computer-Readable Storage Medium

In addition to the foregoing methods and devices, an embodiment of the present disclosure may further provide a computer program product, including computer program instructions. The computer program instructions, when executed by a processor, cause the processor to perform the steps in the communication method for an integrated circuit according to the embodiments of the present disclosure described in the foregoing "exemplary method" part.

The computer program product may be used to write, in any combination of one or more programming languages, program code for performing an operation in this embodiment of the present disclosure. The programming languages include object-oriented programming languages, such as Java and C++, and conventional procedural programming languages, such as "C" language or similar programming languages. The program code may be executed entirely on a user computing device, partly on user equipment, as a standalone software package, partly on a user computing device and partly on a remote computing device, or entirely on a remote computing device or a server.

In addition, this embodiment of the present disclosure may alternatively be a computer-readable storage medium, in which computer program instructions are stored. The computer program instructions, when executed by a processor, cause the processor to perform the steps in the communication method for an integrated circuit according to the embodiments of the present disclosure described in the foregoing "exemplary method" part.

The computer-readable storage medium may be any combination of one or more readable mediums. The readable medium may be a readable signal medium or a readable storage medium. The readable storage medium includes, for example, but is not limited to electrical, magnetic, optical, electromagnetic, infrared, or semiconductor systems, apparatuses, or devices, or any combination thereof. More specific examples (non-exhaustive list) of the readable storage medium include: an electrical connection with one or more conducting wires, a portable disk, a hard disk, a RAM, a ROM, an erasable programmable read-only memory (EPROM or flash memory), an optical fiber, a portable compact disc read-only memory (CD-ROM), an optical memory device, a magnetic memory device, or any suitable combination thereof.

The basic principles of the present disclosure have been described above with reference to specific embodiments. However, the benefits, advantages, effects, and the like mentioned in the present disclosure are only examples rather than limitations, and should not be considered to be necessary for the embodiments of the present disclosure. Moreover, the specific details disclosed above are for exemplary purposes and ease of understanding only, but not for limitation, and the above details do not limit the present disclosure to be implemented by using the specific details described above.

A person skilled in the art can make various modifications and variations to the present disclosure without departing from the spirit and scope of the present application. The present disclosure is intended to cover these modifications and variations provided that they fall within the scope of protection defined by the claims of the present disclosure or equivalents thereof.

What is claimed is:

1. An integrated circuit, including: a first processor, a second processor, a bus, and a first isolation circuit, wherein the first processor is communicatively connected to the second processor through the bus, and the first isolation circuit is disposed on a communication link between the first processor and the bus;

the second processor is configured to transmit a first message to the first processor; and the first isolation circuit is configured to control transmission of the first message based on a correspondence between the first message and a first preset protocol, wherein the first preset protocol defines that a number of data in the first message is equal to a target number.

2. The integrated circuit according to claim 1, wherein the first isolation circuit includes a response monitoring submodule and a protocol checking submodule, the response monitoring submodule is configured to monitor the first message and transmit the first message to the protocol checking submodule when the first message is monitored; and the protocol checking submodule is configured to transmit or block the first message based on the correspondence between the first message and the first preset protocol.

3. The integrated circuit according to claim 2, wherein the protocol checking submodule includes a first monitoring unit, a first processing unit, and a first restoration unit, the first monitoring unit is configured to determine the correspondence between the first message and the first preset protocol;

the first processing unit is configured to block the first message in a case that the first message is not in correspondence to the first preset protocol, or transmit the first message to the first processor in a case that the first message is in correspondence to the first preset protocol; and the first restoration unit is configured to restore the first monitoring unit and the first processing unit to an enabled state after the first processing unit blocks the first message or transmits the first message to the first processor.

4. The integrated circuit according to claim 3, wherein the first message being not in correspondence to the first preset protocol includes: the number of data in the first message is different from the target number preset in the first preset protocol; and the first processing unit is further configured to determine a first association message based on the first preset protocol in a case that the first message is not in correspondence to the first preset protocol, and transmit the first association message to the first processor, wherein a number of data in the first association message is equal to the target number.

5. The integrated circuit according to claim 4, wherein the first processing unit being configured to determine a first association message based on the first preset protocol in a case that the first message is not in correspondence to the first preset protocol includes:

the first processing unit is configured to replenish the number of data in the first message to the target number based on the first preset protocol in a case that the number of data in the first message is less than the target number, to obtain the first association message, or cut out the target number of data from the first message based on the first preset protocol in a case that the number of data in the first message is greater than the target number, to obtain the first association message.

6. The integrated circuit according to claim 3, wherein the first monitoring unit is further configured to transmit first error information or a first interrupt signal in a case that the first message is not in correspondence to the first preset protocol; and the integrated circuit further includes a third microcontroller unit, wherein the third microcontroller unit is configured to receive the first error information transmitted from the first monitoring unit, or acquire the first error information from a register of the integrated circuit in response to the first interrupt signal transmitted from the first monitoring unit, wherein the first error information includes an error type of the first message; and the third microcontroller unit is further configured to determine a corresponding handling policy based on the error type in the first error information, restart or reset the second processor based on the handling policy, and output first warning information.

7. The integrated circuit according to claim 2, wherein the response monitoring submodule includes a second monitoring unit, a message retransmission unit, a second processing unit, and a second restoration unit, wherein the first message includes a response message transmitted from the second processor to the first processor in a case that a first access request message transmitted from the first processor is received by the second processor;

the second monitoring unit is configured to transmit second error information to the message retransmission unit in a case that the first message is not monitored for a first duration from when the first access request message is monitored, wherein the second error information includes that an error type of timeout;

the message retransmission unit is configured to retransmit the first access request message to the second processor when the second error information is received by the message retransmission unit;

the second processing unit is configured to transmit a preset response message corresponding to the first access request message to the first processor in a case that the first message is not monitored for a second duration from when the message retransmission unit retransmits the first access request message; and the second restoration unit is configured to restore the second monitoring unit, the message retransmission unit, and the second processing unit to an enabled state after processing of the timeout of the first message through the response monitoring submodule is completed.

8. The integrated circuit according to claim 7, wherein the message retransmission unit is configured to: in a case that the first access request message is cached in a register of the integrated circuit and the second error information is received, retransmit the first access request message cached in the register to the second processor.

9. The integrated circuit according to claim 7, wherein the second processing unit is further configured to transmit the second error information or a second interrupt signal when the first message is not monitored for the second duration from when the first access request message is retransmitted; and the integrated circuit further includes a third microcontroller unit, wherein the third microcontroller unit is configured to receive the second error information transmitted from the second processing unit, or acquire the second error information from a register of the integrated circuit in response to the second interrupt signal transmitted from the second processing unit, wherein the second error information includes an error type of the first message; and the third microcontroller unit is further configured to determine a corresponding handling policy based on the error type in the second error information, restart or reset the second processor based on the handling policy, and output third warning information.

10. The integrated circuit according to claim 1, further including: a second isolation circuit, wherein the second isolation circuit is disposed on a communication link between the bus and the second processor, and is configured to control transmission of the first message based on a correspondence between the first message and a second preset protocol before the first message arrives at the bus;

and/or the second isolation circuit is disposed on a communication link between the bus and the first isolation circuit, and is configured to: before a second message transmitted from the first processor to the second processor arrives at the bus, control transmission of the second message based on a correspondence between the second message and the second preset protocol.

11. The integrated circuit according to claim 1, wherein a security level of the first processor is higher than a security level of the second processor.

12. A communication method for an integrated circuit, including:

monitoring a first message transmitted from a second processor of the integrated circuit to a first processor of the integrated circuit; and controlling transmission of the first message based on a correspondence between the first message and a first preset protocol when the first message is monitored, wherein the first preset protocol defines that a number of data in the first message is equal to a target number.

13. The method according to claim 12, wherein the controlling transmission of the first message based on a correspondence between the first message and a first preset protocol when the first message is monitored includes: blocking the first message in a case that the first message is not in correspondence to the first preset protocol; or transmitting the first message in a case that the first message is in correspondence to the first preset protocol.

14. The method according to claim 13, wherein the first message being not in correspondence to the first preset protocol includes: the number of data in the first message is different from the target number preset in the first preset protocol; and the method further includes:

determining a first association message based on the first preset protocol in a case that the first message is not in correspondence to the first preset protocol, and transmitting the first association message to the first processor, wherein a number of data in the first association message is equal to the target number.

15. An electronic device, including: the integrated circuit according to claim 1.

16. The electronic device according to claim 15, wherein the first isolation circuit includes a response monitoring submodule and a protocol checking submodule, the response monitoring submodule is configured to monitor the first message and transmit the first message to the protocol checking submodule when the first message is monitored; and the protocol checking submodule is configured to transmit or block the first message based on the correspondence between the first message and the first preset protocol.

17. The electronic device according to claim 15, further including: a second isolation circuit, wherein the second isolation circuit is disposed on a communication link between the bus and the second processor, and is configured to control transmission of the first message based on a correspondence between the first message and a second preset protocol before the first message arrives at the bus;

and/or the second isolation circuit is disposed on a communication link between the bus and the first isolation circuit, and is configured to: before a second message transmitted from the first processor to the second processor arrives at the bus, control transmission of the second message based on a correspondence between the second message and the second preset protocol.

18. A non-transitory computer-readable storage medium, in which a computer program is stored, wherein the computer program, when executed by a processor, causes the processor to implementing the communication method for an integrated circuit according to claim 12.

19. The non-transitory computer-readable storage medium according to claim 18, wherein the controlling transmission of the first message based on a correspondence between the first message and a first preset protocol when the first message is monitored includes: blocking the first message in a case that the first message is not in correspondence to the first preset protocol; or transmitting the first message in a case that the first message is in correspondence to the first preset protocol.

20. The non-transitory computer-readable storage medium according to claim 19, wherein the first message being not in correspondence to the first preset protocol includes: the number of data in the first message is different from the target number preset in the first preset protocol; and the method further includes:

determining a first association message based on the first preset protocol in a case that the first message is not in correspondence to the first preset protocol, and transmitting the first association message to the first processor, wherein a number of data in the first association message is equal to the target number.

* * * * *